US012718664B2

(12) United States Patent
Lockheed et al.

(10) Patent No.: US 12,718,664 B2
(45) Date of Patent: Aug. 25, 2026

(54) ELECTRONIC GAMING SYSTEMS AND METHODS WITH PERSISTENT WILD AND PRIZE DUAL SYMBOLS

(71) Applicant: Aristocrat Technologies, Inc., Las Vegas, NV (US)

(72) Inventors: Kelly Lockheed, Elkridge, MD (US); Jeffrey Uss, Liberty Hill, TX (US); Hanna Sanborn, Georgetown, TX (US); Nathan Warms, Austin, TX (US); Zachary Smith, Austin, TX (US); Rogelio Decasa, Jr., Renton, WA (US); Jennifer Mizzi, Ewa Beach, HI (US); Scott Hopkins, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 306 days.

(21) Appl. No.: 17/957,764

(22) Filed: Sep. 30, 2022

(65) Prior Publication Data

US 2024/0112544 A1 Apr. 4, 2024

(51) Int. Cl.
*G07F 17/34* (2006.01)
*G07F 17/32* (2006.01)

(52) U.S. Cl.
CPC ...... *G07F 17/3267* (2013.01); *G07F 17/3211* (2013.01); *G07F 17/34* (2013.01)

(58) Field of Classification Search
CPC ... G07F 17/34; G07F 17/3211; G07F 17/3267
USPC .......................................................... 463/20
See application file for complete search history.

(56) References Cited

U.S. PATENT DOCUMENTS

2010/0029381 A1* 2/2010 Vancura .............. G07F 17/3267 463/30
2015/0094132 A1* 4/2015 Elias ....................... G07F 17/34 463/20
2016/0104345 A1 4/2016 Macgregor
2016/0225221 A1* 8/2016 Jackson ................ G07F 17/326
2017/0221313 A1 8/2017 Basallo
2018/0061176 A1 3/2018 Berman
2018/0130307 A1* 5/2018 Lamb .................. G07F 17/3267
2018/0182202 A1* 6/2018 Shiraishi ............. G07F 17/3213
2020/0273293 A1 8/2020 Sanborn
2020/0294367 A1 9/2020 Crispino
2021/0082252 A1 3/2021 Honeycutt
(Continued)

OTHER PUBLICATIONS

IGT, "IGT Ocean Magic Slot", Apr. 20, 2017.

*Primary Examiner* — Ryan Hsu
(74) *Attorney, Agent, or Firm* — Armstrong Teasdale LLP

(57) ABSTRACT

An electronic gaming device that includes a display device, an input device, a memory device, and a processor is described. The processor causes to be displayed a dual symbol configured as a wild symbol and as a credit on reel (or cash-on-reel) symbol that indicates a prize to be awarded if a trigger symbol also lands in the same row as the dual symbol. The processor causes a base game to be initiated that includes causing symbols to be displayed on reels within a display matrix on a display device wherein each reel is configured to spin. During game play of the base game, the dual symbol, if displayed, persists between different reel spins and moves up one row each reel spin from a previous symbol position to a new symbol position.

20 Claims, 26 Drawing Sheets

(56) References Cited

U.S. PATENT DOCUMENTS

| | | | | |
|---|---|---|---|---|
| 2021/0142622 | A1* | 5/2021 | Sanborn .................. | G07F 17/34 |
| 2023/0005340 | A1* | 1/2023 | Guerrero ............. | G07F 17/3265 |

* cited by examiner

ELECTRONIC GAMING SYSTEMS AND METHODS WITH PERSISTENT WILD AND PRIZE DUAL SYMBOLS

TECHNICAL FIELD

The field of disclosure relates generally to electronic gaming, and more specifically, to electronic gaming systems and methods that include electronic games having persistent wild and prize dual symbols.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device, a memory device storing instructions, and a processor in communication with the display device and the memory device. When the instructions are executed by the processor, the processor is caused to cause a first base game outcome to be displayed on the display device, the first base game outcome comprising a plurality of symbols included on a plurality of reels, wherein each reel of the plurality of reels is positioned next to at least one other reel such that the plurality of symbols are positioned in a plurality of rows and form a display matrix. The processor is also caused to determine that the plurality of symbols included in the display matrix includes a dual symbol in a first dual symbol display position, wherein the dual symbol includes both a prize function and a wild function. The processor is also caused to treat the dual symbol as a wild symbol including evaluating the display matrix by comparing the plurality of symbols included in the display matrix to a lookup table saved in memory and, in response to the evaluation, determine a first credit prize to be awarded for the first base game outcome. The processor is also caused to determine that the plurality of symbols included in the display matrix also includes a trigger symbol in a same row as the dual symbol and, in response to the trigger symbol being displayed in the display matrix in the same row as the dual symbol, activate the prize function of the dual symbol including awarding a second credit prize for the first base game outcome. The processor is further caused to award a combination of the first credit prize and the second credit prize.

In another aspect, a method of electronic gaming is provided. The method includes causing a first base game outcome to be displayed on a display device, the first base game outcome comprising a plurality of symbols included on a plurality of reels, wherein each reel of the plurality of reels is positioned next to at least one other reel such that the plurality of symbols are positioned in a plurality of rows and form a display matrix. The method also includes determining that the plurality of symbols included in the display matrix includes a dual symbol in a first dual symbol display position, wherein the dual symbol includes both a prize function and a wild function. The method also includes treating the dual symbol as a wild symbol including evaluating the display matrix by comparing the plurality of symbols included in the display matrix to a lookup table saved in memory and, in response to the evaluation, determining a first credit prize to be awarded for the first base game outcome. The method also includes determining that the plurality of symbols included in the display matrix also includes a trigger symbol in a same row as the dual symbol and, in response to the trigger symbol being displayed in the display matrix in the same row as the dual symbol, activating the prize function of the dual symbol including awarding a second credit prize for the first base game outcome. The method further includes awarding a combination of the first credit prize and the second credit prize.

In yet another aspect, a non-transitory computer-readable storage medium with instructions stored thereon is provided. When the instructions are executed by a processor, the processor is caused to cause a first base game outcome to be displayed on a display device, the first base game outcome comprising a plurality of symbols included on a plurality of reels, wherein each reel of the plurality of reels is positioned next to at least one other reel such that the plurality of symbols are positioned in a plurality of rows and form a display matrix. The processor is also caused to determine that the plurality of symbols included in the display matrix includes a dual symbol in a first dual symbol display position, wherein the dual symbol includes both a prize function and a wild function. The processor is also caused to treat the dual symbol as a wild symbol including evaluating the display matrix by comparing the plurality of symbols included in the display matrix to a lookup table saved in memory and, in response to the evaluation, determine a first credit prize to be awarded for the first base game outcome. The processor is also caused to determine that the plurality of symbols included in the display matrix also includes a trigger symbol in a same row as the dual symbol and, in response to the trigger symbol being displayed in the display matrix in the same row as the dual symbol, activate the prize function of the dual symbol including awarding a second credit prize for the first base game outcome. The processor is further caused to award a combination of the first credit prize and the second credit prize.

DETAILED DESCRIPTION

Figure 1:
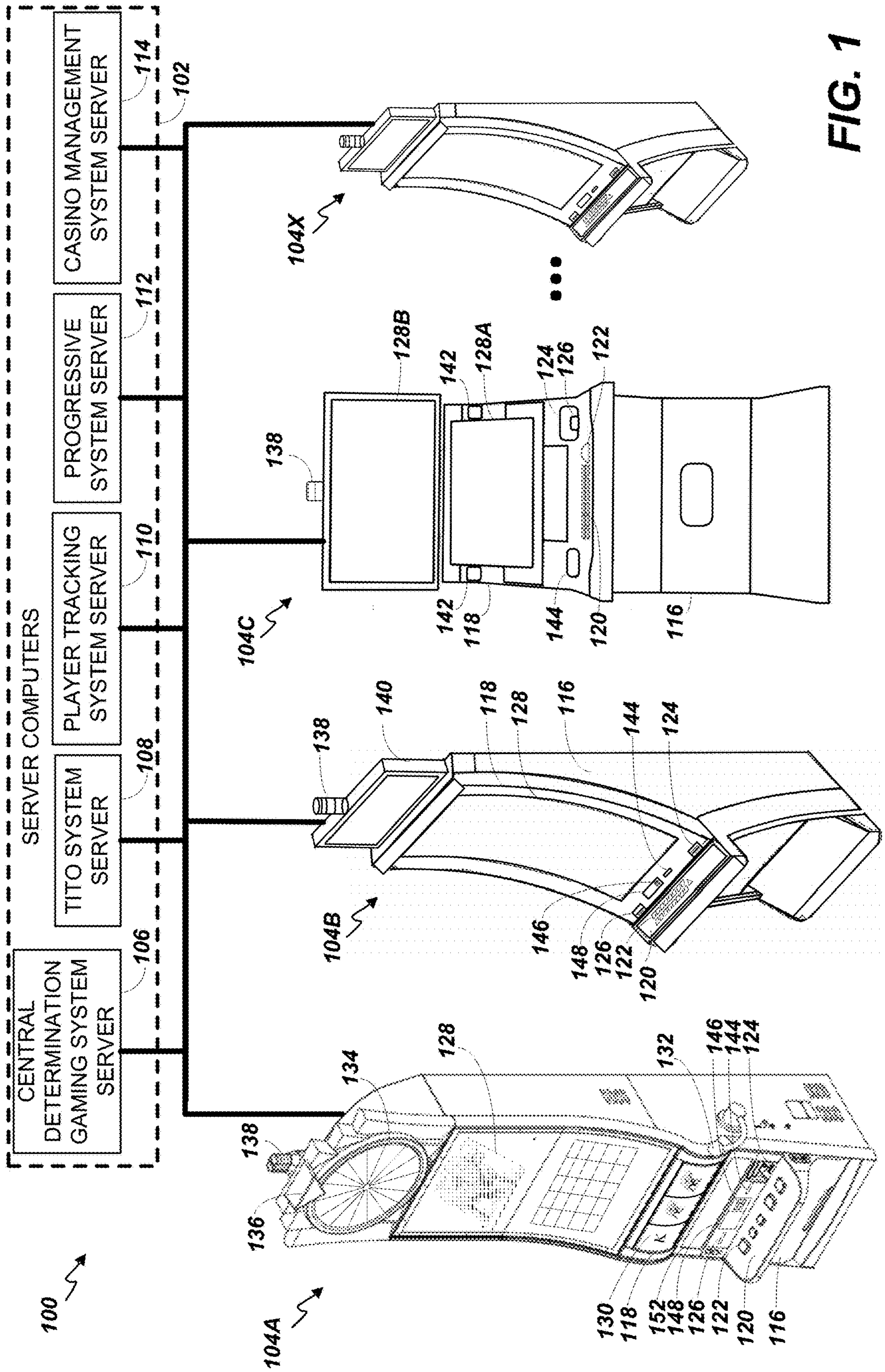
FIG. 1 is an exemplary diagram showing several EGMs networked with various gaming related servers.

The present application is directed to electronic gaming or electronic game play, and more specifically, to computer based electronic gaming or game systems and methods that include a gaming computing device having at least one processor programmed to cause display of a dual symbol configured as a wild symbol and as a credit on reel (or cash-on-reel) symbol that indicates a prize to be awarded if a trigger symbol also lands in the same row as the dual symbol. The gaming system initiates a base game that includes causing symbols to be displayed on reels within a display matrix on a display device wherein each reel is configured to spin (e.g., mechanically or virtually). During game play of the base game, the dual symbol, if displayed, persists between different reel spins (e.g., different game instances of the base game). For each subsequent spin after the dual symbol is displayed, the dual symbol moves up one row from a previous symbol position to a new symbol position. The moving up a row repeats until the dual symbol moves off of the display matrix or the base game session is ended.

In other words, each dual symbol may be associated with two features: (i) a wild feature that is determined by one or more pay tables stored in a memory of the gaming system; and (ii) a credit on reel (COR) feature (e.g., either a value amount or a jackpot identifier) that may be activated and awarded if the dual symbol appears in the same row as a trigger symbol (e.g., a blast symbol). In addition, the dual symbol is also persistent in that after it lands on the display matrix, it moves up a row position (e.g., climbs the ladder) for the next spin in the base game, and continues to climb or move up a row until it leaves the display matrix or until the base game session is completed.

The gaming system may also initiate a bonus game of bonus spins from within the base game if one or more bonus symbols are displayed during the base game. The number of bonus spins may be based on the number of bonus symbols displayed during the base game. During game play of the bonus game, the dual symbol, if displayed, persists between different reel spins (e.g., different game instances of the bonus game), sticking in the same spot for each subsequent spin after the dual symbol is displayed. The gaming system may dynamically replace a wild symbol (such as an additional dual symbol) with a non-wild symbol if the wild symbol is positioned in a reel position already populated by the persistent dual symbol. The gaming system may also initiate a feature game of additional spins that includes one or more display areas of the bonus game. If the feature game includes more than one display area, the display areas may appear to be stacked and trigger symbols may be mirrored between the two display areas (e.g., displayed in the same respective symbol position of the two display areas). The mirrored trigger symbols may trigger a prize and/or a two-time multiple of the prize as indicated by a dual symbol in the same row as a trigger symbol on any of the display areas.

Certain technical problems arise when implementing persistent wild and prize dual symbols, as described herein. For example, a negative impact on award probability may be communicated if a persistent dual symbol covers a wild and/or bonus symbol without dynamic symbol replacement of the wild and/or bonus symbol. Further, a persistent symbol that moves positions within a row of a display matrix with subsequent spins may need a separate symbol position determination from the rest of the plurality of symbols.

Accordingly, technical solutions are described herein to address at least the technical problems described above. Technical solutions represented by the present disclosure include at least: (i) generating and causing display of an electronic game that may provide an improved award probability to a player by displaying a dual symbol that can serve as a wild symbol and a credit on reel symbol concurrently; (ii) generating and causing display of an electronic game that may provide an improved award probability to a player by displaying a dual symbol that persists between reel spins by moving up one row each subsequent spin until the dual symbol moves up and off the reels; (iii) generating and causing display of an electronic game that may provide an improved award probability to a player by displaying a dual symbol that persists between reel spins by remaining in a set position on the reels with subsequent spins; (iv) generating and causing display of an electronic game that dynamically replaces a wild and/or bonus symbol during a spin of a reel if the wild and/or bonus symbol is set to land in a reel position to be populated by a persistent dual symbol; (v)

generating and causing display of an electronic game that may provide an improved award probability to a player by evaluating a bonus symbol in a winning symbol combination prior to the dynamic replacement of the bonus symbol by the persistent dual symbol; and (vi) generating and causing display of an electronic game that includes a trigger symbol that may trigger a credit on reel prize displayed on a dual symbol by landing in the same row as the dual symbol.

The systems and methods described herein may be used in bingo based (such as Class II) games, RNG based (such as Class III) games, and/or other games. For example, the feature of displaying a dual symbol that acts as a wild symbol and as a credit on reel symbol that indicates a prize to be awarded if a trigger symbol lands in the same row may be used in Class II (e.g., bingo) games and/or Class III games, as described elsewhere herein. For example, Class II bingo-style games may include pull-tab games, lotteries, punch boards, tip jars, and instant bingo, among others. In some bingo-based wagering games, a game system generates a bingo card at random and evaluates the bingo card against a randomly drawn ball call. The evaluation determines whether the player wins and, if so, determines a payout. Class III games typically include a random number generator (RNG) that can generate its own game results. Class III games include traditional non-bingo-based casino games, such as, for example, slot machines, black jack, roulette, and craps, among others.

For example, a game outcome of a Class II (e.g., bingo) game that displays a dual symbol that acts as a wild symbol and as a credit on reel symbol that indicates a prize to be awarded if a trigger symbol lands in the same row may be determined by comparing one or more patterns of marked (and/or "daubed") cells of a bingo card with a pay-table of winning bingo patterns. If the bingo card does not include a pattern that matches a pattern in the pay-table of winning patterns, then a losing bingo outcome is determined, and a facade (e.g., reels) may be displayed to the player showing no award provided to the player. If the bingo card does include a pattern that matches a pattern in the pay-table of winning patterns, then a winning bingo outcome is determined, and a facade (e.g., reels) may be displayed to the player showing a reward provided to the player.

Different winning patterns may be associated with different awards. The award for a winning bingo outcome may be based on an amount wagered, an associated bingo pay-table, an associated set of rules for the bingo card, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when the bingo card is evaluated against the pay-table of winning patterns. In some examples, the player may be awarded for only the highest priority pattern (e.g., the highest paying winning pattern) that is matched. Other methods of play of a Class II bingo game are also envisioned and are within the scope of this disclosure. In some cases, the façade that is displayed may include an award from the base game and an additional award from the bonus or wheel game.

In another example, a game outcome of a Class III game that displays a dual symbol that acts as a wild symbol and indicates a potential prize to be awarded if a trigger symbol lands in the same row may be determined by comparing one or more patterns of symbols arrayed in a matrix on a plurality of reels with a pay-table of winning pay-lines through the matrix. If the matrix of symbols does not include a pattern that matches a winning pay-line in the pay-table of winning patterns, then a losing outcome is determined, and no award may be provided to the player. If the matrix of symbols does include a pattern that matches a winning pay-line in the pay-table of winning patterns, then a winning outcome is determined, and an award may be provided to the player. A random number generator (RNG) may be utilized to randomly determine the outcome of each game.

Different winning patterns may be associated with different awards. The award for a winning outcome may be based on an amount wagered, an associated pay-table, a probability (and/or likelihood) of achieving a particular pattern, and/or other considerations. In some examples, the player/player account may be awarded for multiple patterns (e.g., all winning pay-lines) that are matched when the matrix of symbols is evaluated against the pay-table of winning patterns. In some examples, the player may be awarded for only the highest priority pattern (e.g., the highest paying winning pattern) that is matched. Other methods of play of a Class III game are also envisioned and are within the scope of this disclosure.

As used herein, the term "base game" may refer to games initiated in response to one of a plurality of game initiation events, such as a wager or credit being received by or transferred to an EGM, as described herein. A base game may be associated with a base game outcome represented by a plurality of base game symbols or base game reels, each of which may include a plurality of base game symbols, and each of which may be selected based on an evaluation of a bingo card and ball call (e.g., in Class II games) or upon a random number generated by a random number generator (e.g., in Class III games).

Further, as used herein, the term "bonus game" may refer generally to a game or a component of a game involving procedures in addition to the base game. In some embodiments, a bonus game may be triggered from a base game and may be associated with a bonus game outcome, which may be different from the base game outcome. For example, a bonus game may be initiated after, or during, a base game and in response to the occurrence of a particular condition, such as a "trigger condition" occurring during the base game. A bonus game may result in a bonus game outcome or bonus award that increases a base game award or adds a bonus game award to a base game award.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
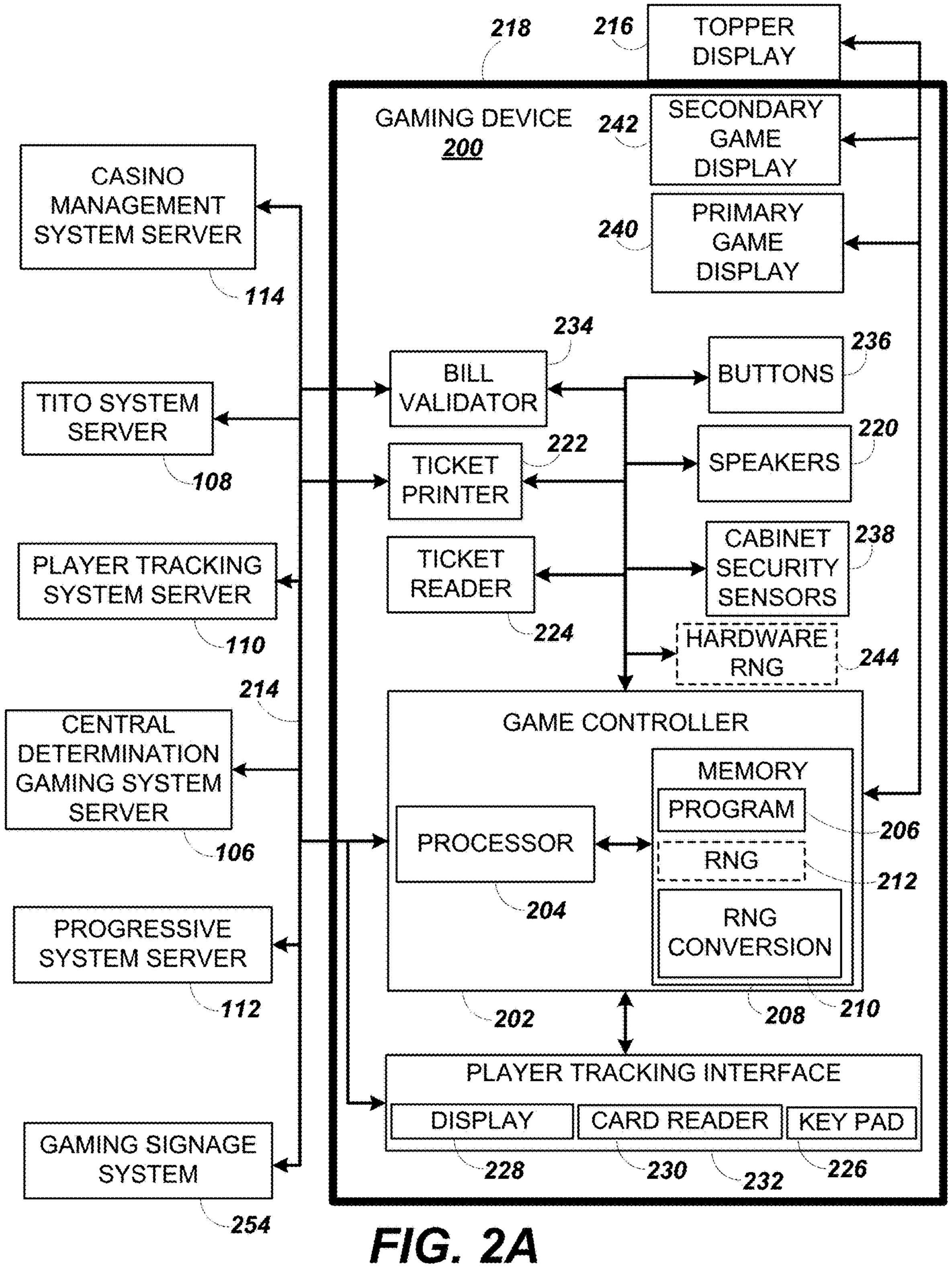
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit prizes based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may cause to be displayed visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
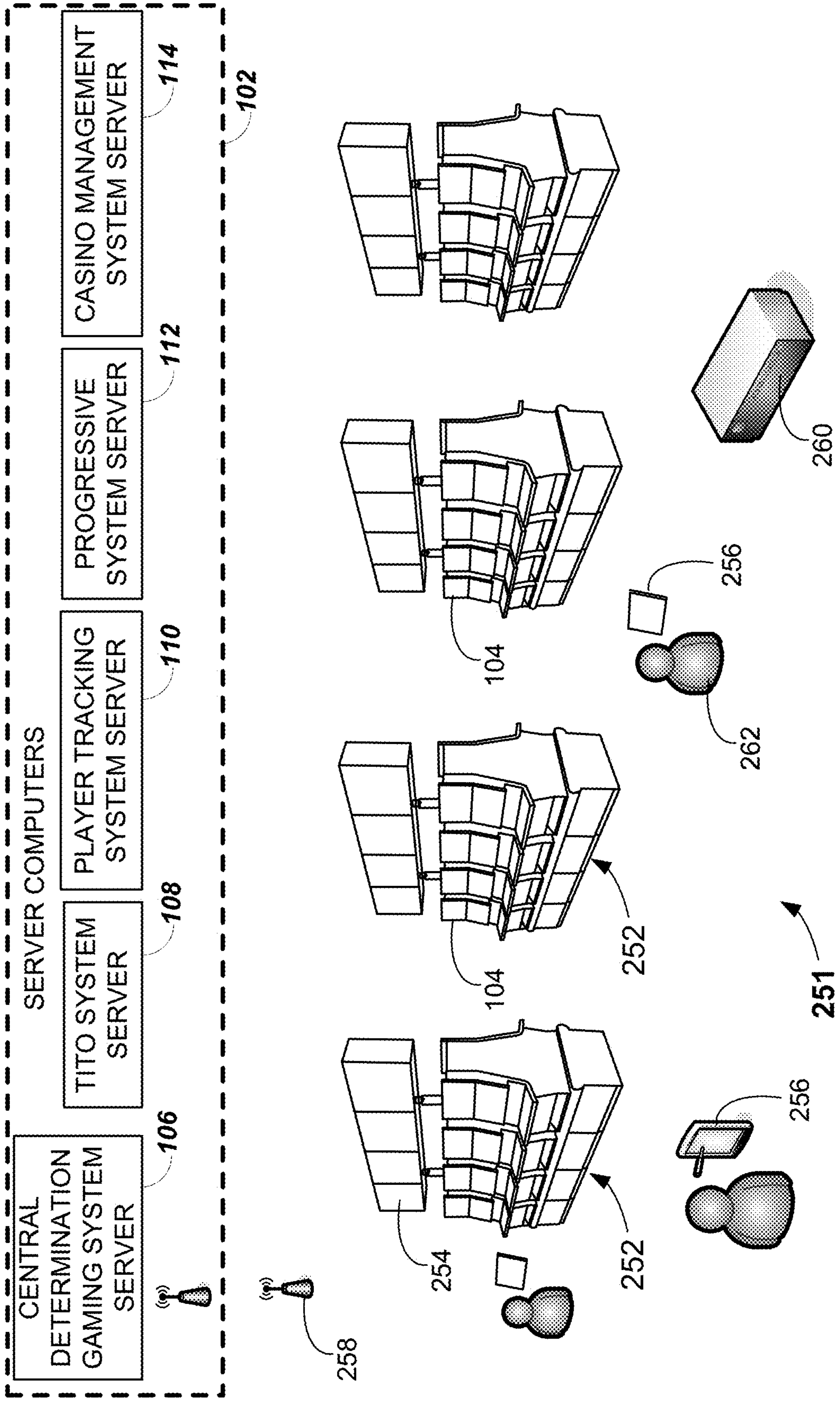
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
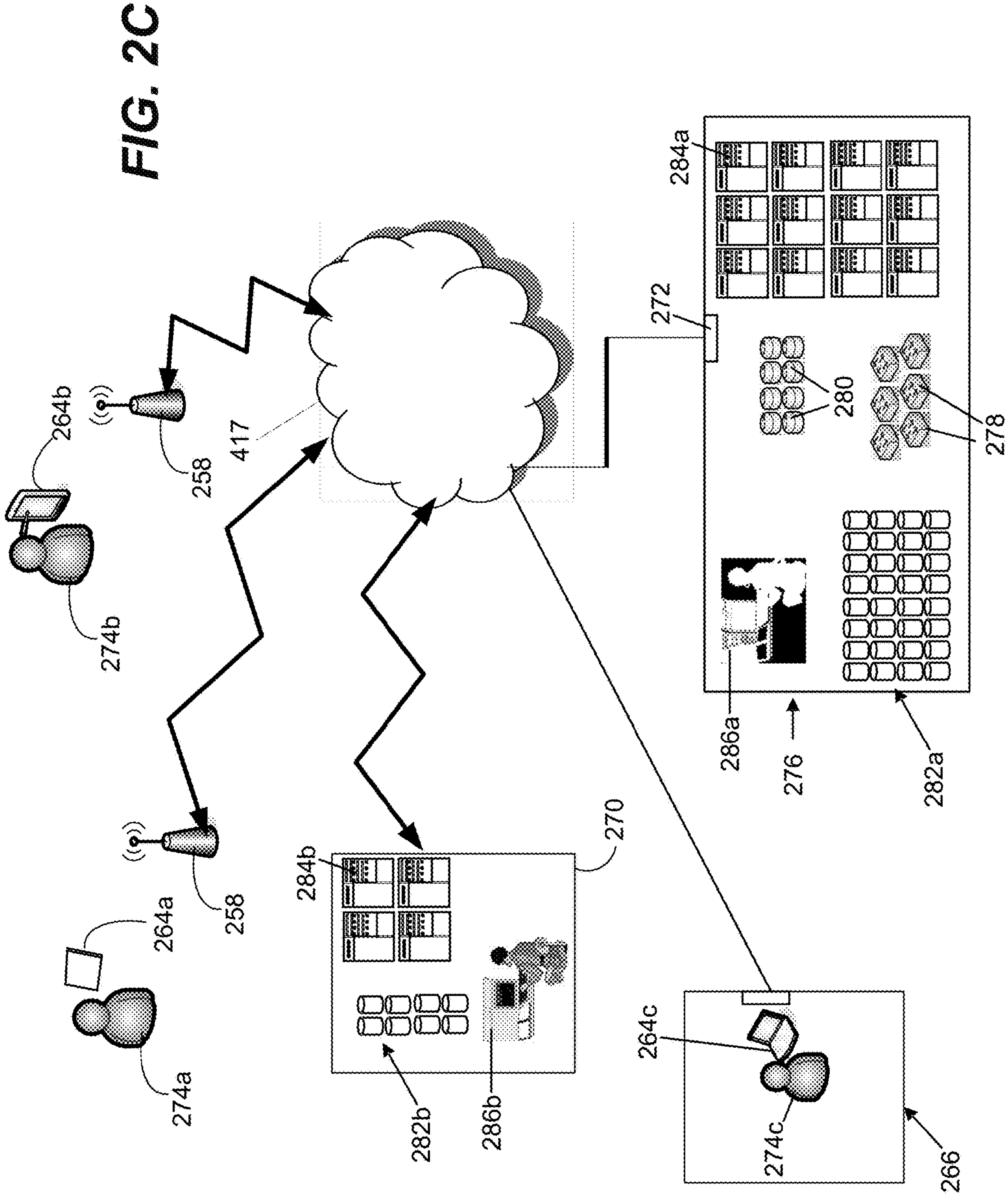
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
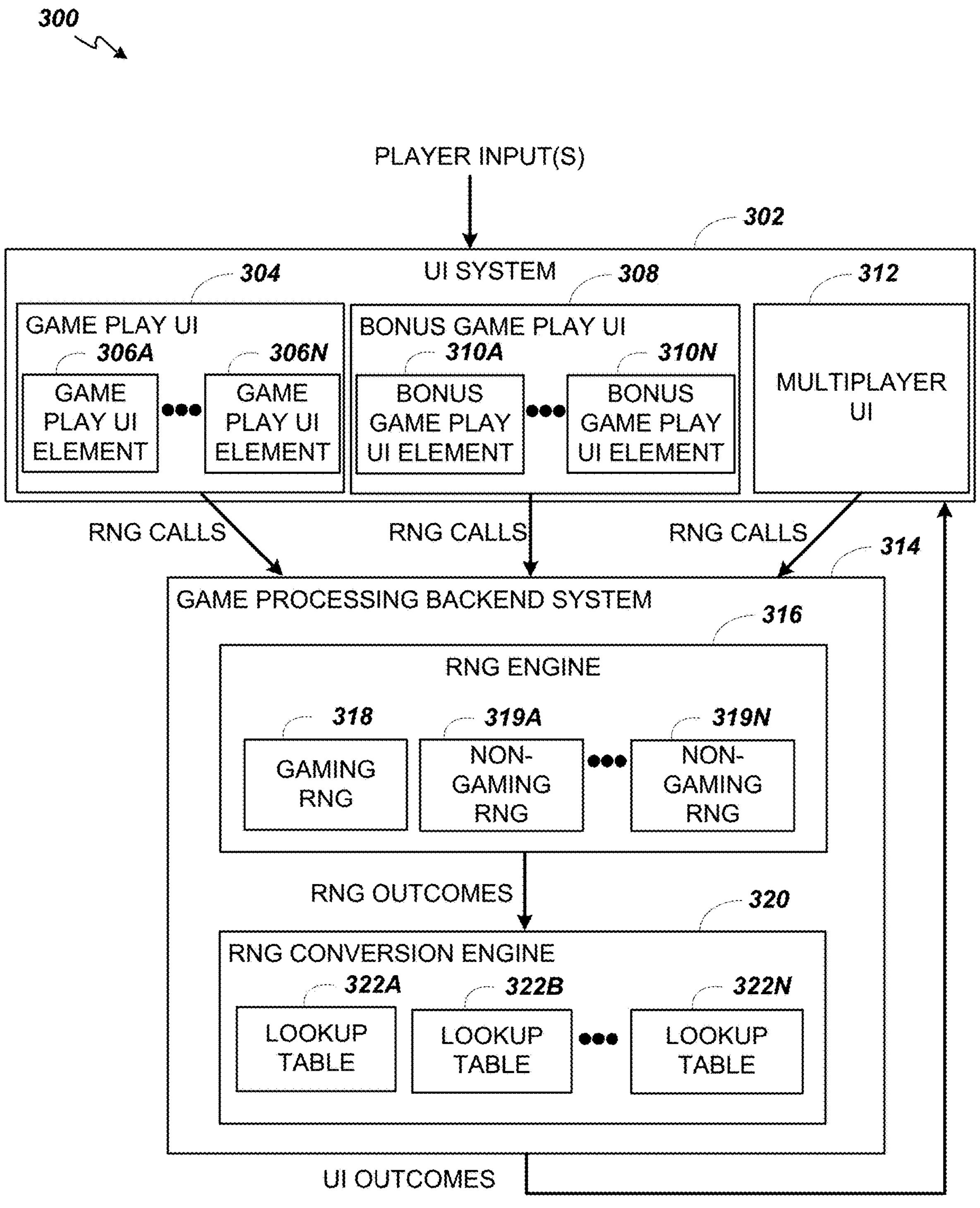
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
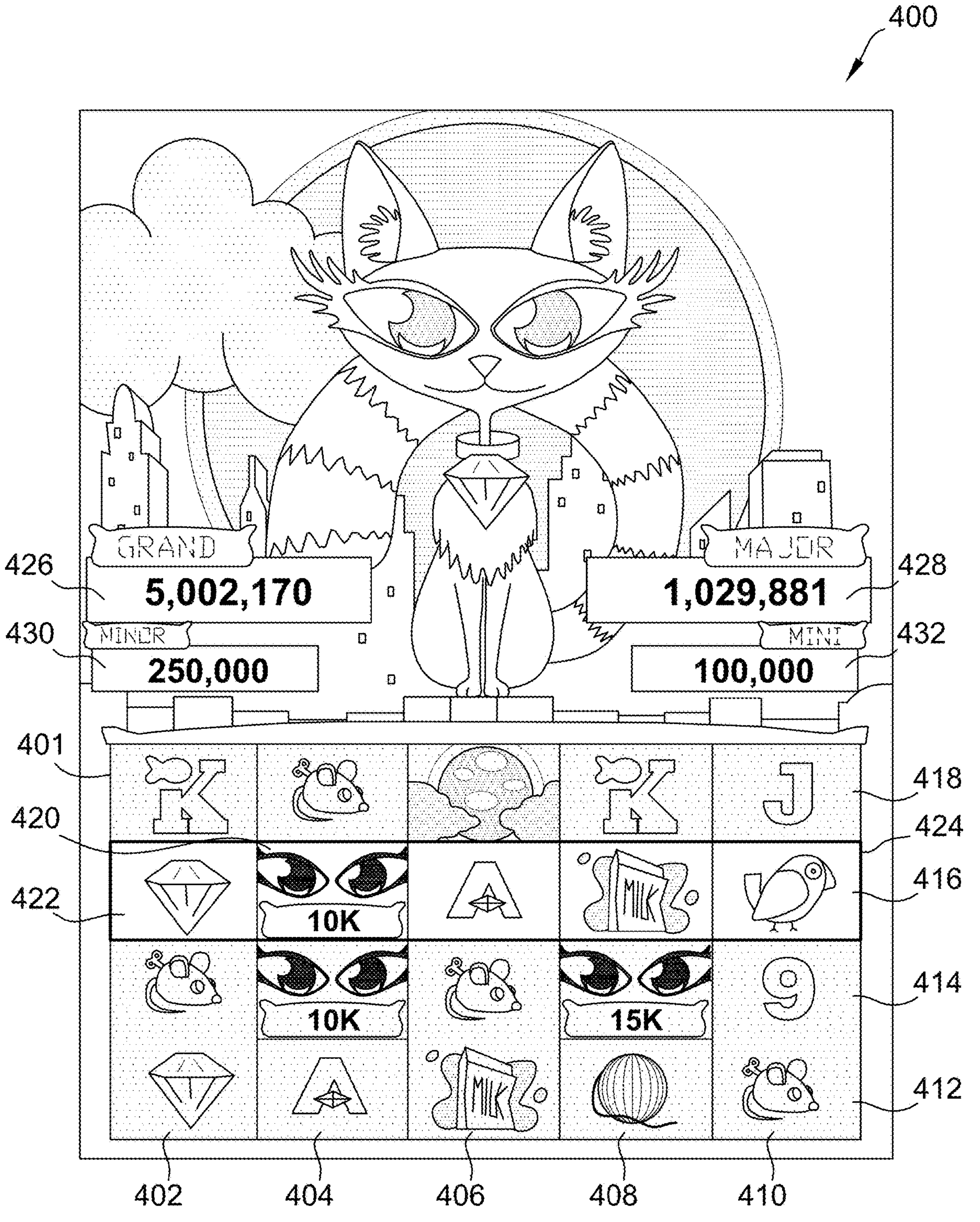
FIG. 4 is an example user interface or screenshot of a base game of an example electronic game played on an electronic gaming machine similar to the ones shown in FIG. 1 in accordance with the present disclosure.

FIG. 4 is an example user interface or screenshot 400 of a base game of an exemplary electronic game in accordance with the present disclosure. In the example of FIG. 4, a plurality of reels 402-410 are displayed in a primary game display area 401 of a gaming device (e.g., gaming devices 104A-104X, 256, and/or 264*a*-264*c*) by a game controller (e.g., game controller 202). While five reels 402-410 are shown in the example of FIG. 4, in some examples, more or fewer reels may be used. In some examples, reels 402-410 may be implemented as mechanical reels or may include virtual reels that are computer generated and displayed on a computer display screen/display device. As shown, each reel of reels 402-410 includes a plurality of symbol display positions along a plurality of rows 412-418 for displaying symbols (and/or symbol combinations) which may be associated with winning and/or losing reel game outcomes and/or awards.

In operation, game controller 202 (shown in FIG. 2A) may cause display of a plurality of symbols on reels 402-410. The plurality of symbols may include a dual symbol 420 that includes a wild feature (e.g., a symbol that may act as any other symbol to form a winning combination of symbols) and a prize feature. The wild feature allows dual symbol 420 to act as a wild symbol to form winning symbol combinations on reels 402-410. The prize feature allows dual symbol 420 to act as a credit on reel symbol and indicates a prize (such as, in the example of FIG. 4, 10 K credits) on dual symbol 420 that may be triggered and awarded to a player. The prize indicated on dual symbol 420 may include, but is not limited to, a credit value, a jackpot award associated with a jackpot meter, and/or a number of bonus/additional spins.

Figure 8:
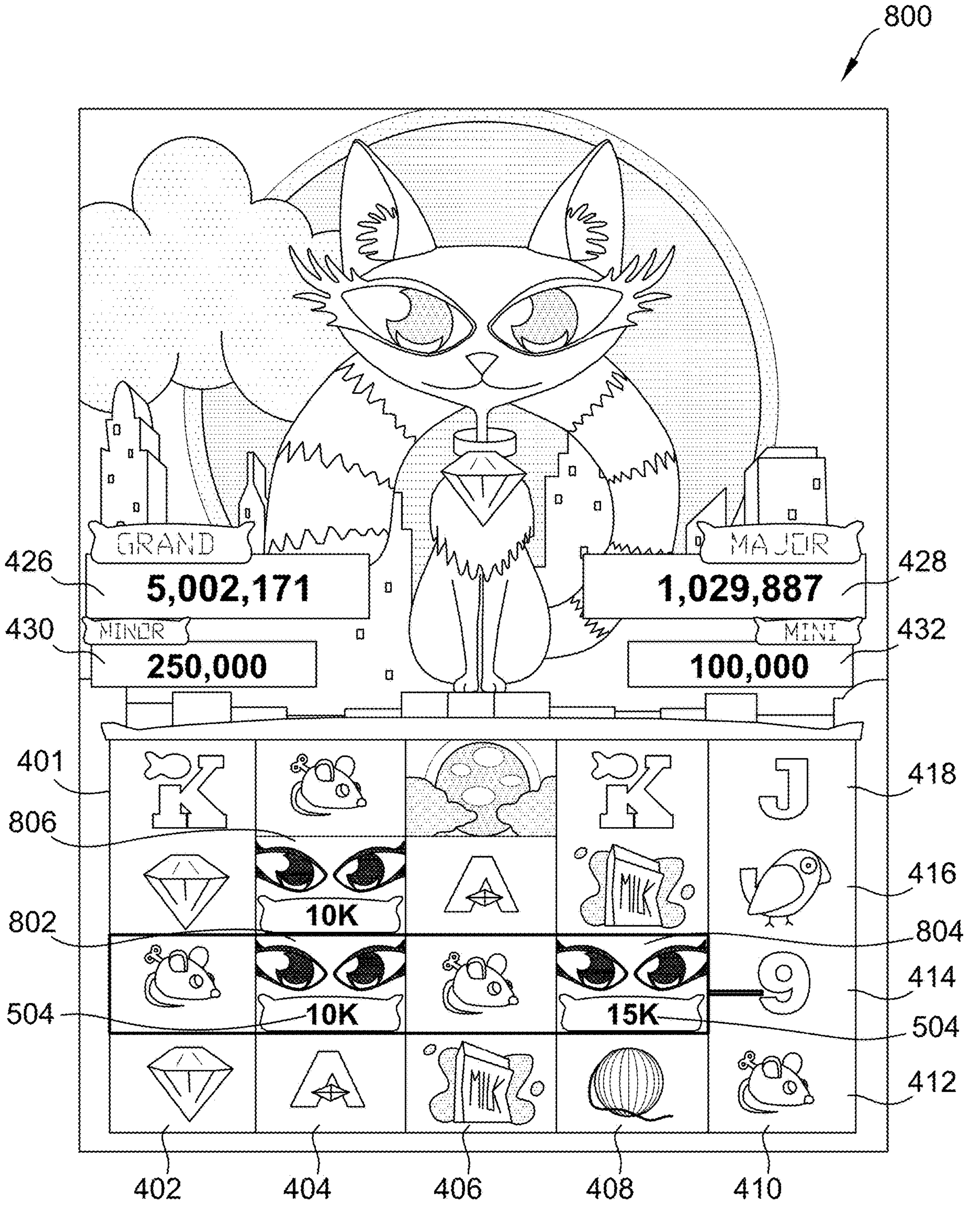

The wild feature may be activated by the display of dual symbol 420 as part of a winning symbol combination on reels 402-410, as shown and described in more detail with respect to FIG. 8. The prize feature may be activated by the display of dual symbol 420 and a trigger symbol 422 in a shared row of rows 412-418, triggering the awarding of the prize indicated on dual symbol 420 to the player, as shown in row 416 in FIG. 4. Dual symbol 420 may appear to match the theme of the electronic game caused to be displayed by game controller 202. In some examples, dual symbol 420 may have an alternative appearance. As shown in FIG. 4, trigger symbol 422 may be displayed to appear as a diamond shape.

In the example of FIG. 4, trigger symbol 422 is displayed only on reel 402. In some examples, trigger symbol 422 may be displayed on any of reels 402-410 and/or on a combination of reels 402-410. The activation of the prize feature of dual symbol 420, by the display of dual symbol 420 and trigger symbol 422 in a shared row of rows 412-418, may cause game controller 202 to display the shared row as a highlighted row 424 to communicate that the prize feature of dual symbol 420 has been activated. As shown in FIG. 4, highlighted row 424 may appear visibly brighter than the other rows of rows 412-418, with the other rows appearing visibly dimmer and/or “grayed out.” Highlighted row 424 may also appear to have a border around the outer edges of the row of symbols across reels 402-410. In some examples, highlighted row 424 may have an alternative appearance.

Game controller 202 may cause to be displayed a plurality of jackpot meters 426-432 in primary game display area 401, including a grand jackpot meter 426, a major jackpot meter 428, a minor jackpot meter 430, and a mini jackpot meter 432. Game controller 202 may cause to be displayed credit prize values in jackpot meters 426-432 to be awarded if a respective jackpot award as included on dual symbol 420 is triggered. If a jackpot award of one or more of jackpot meters 426-432 is awarded, the respective one or more of jackpot meters 426-432 may be “reset” to a base value. For example, if a jackpot award associated with grand jackpot meter 426 is awarded, the credit prize value displayed by grand jackpot meter 426 may be “reset” to a base jackpot value, such as, but not limited to, 100,000 credits.

Figure 5:
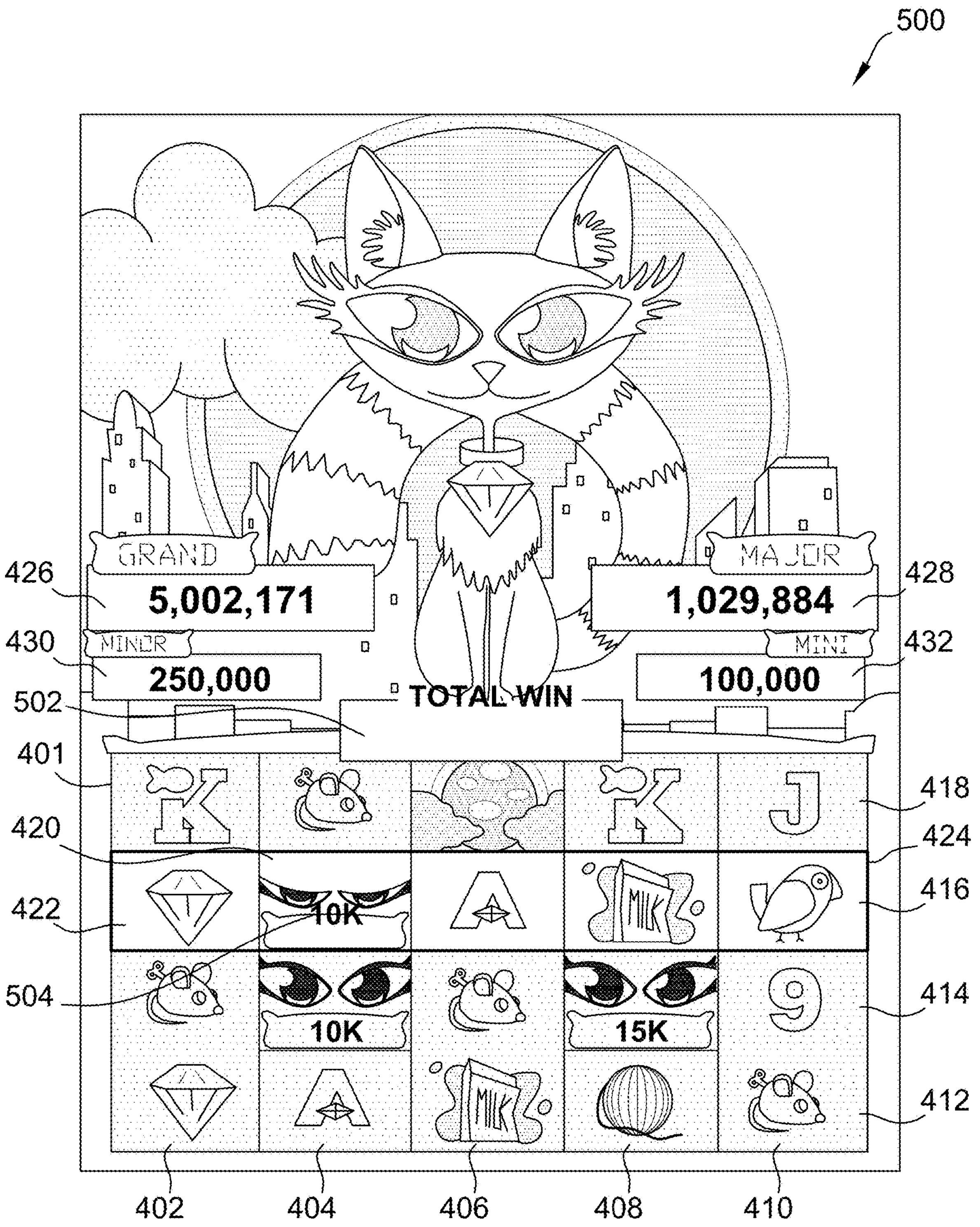
FIGS. 5-11 are example user interfaces or screenshots of the base game shown in FIG. 4.
Figure 6:
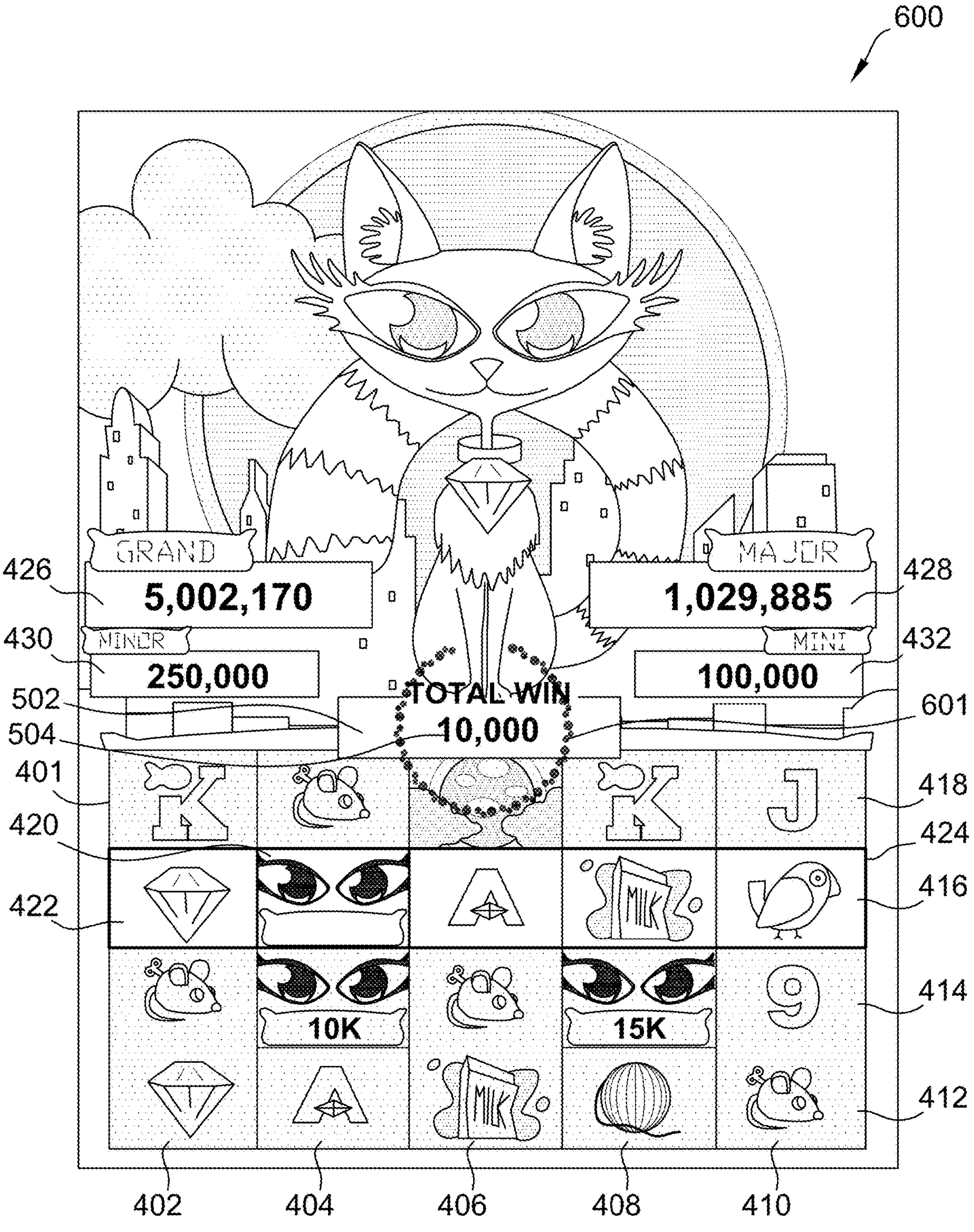
Figure 7:
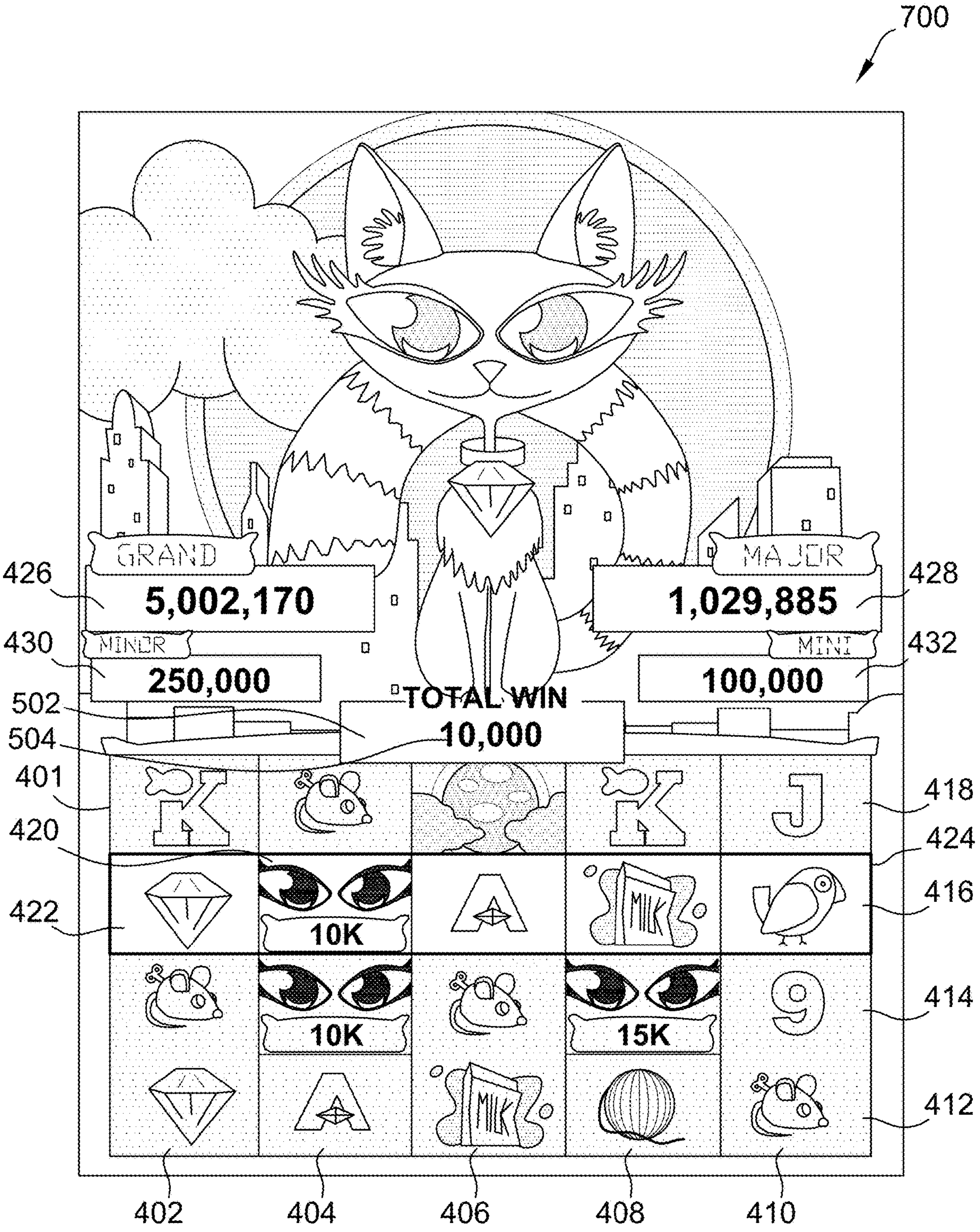

FIGS. 5-7 are example user interfaces or screenshots 500-700 of the base game of the exemplary electronic game, continuing the example shown in FIG. 4. The prize feature of dual symbol 420 may include a credit prize 504. As shown in FIG. 5, game controller 202 (shown in FIG. 2A) may cause to be displayed a total win meter 502 when the prize feature of dual symbol 420 is activated to communicate an award amount from triggered dual symbol 420. In some examples, one or more of dual symbol 420 may be triggered. In the example of FIG. 5, credit prize 504 of dual symbol 420 in row 416 is 10 K. Game controller 202 may cause to be displayed an animation of credit prize 504 to communicate the inclusion of credit prize 504 in the amount to be awarded from one or more of dual symbol 420 that has been triggered. The display of the animation of credit prize 504 may appear as a migration of credit prize 504 from dual symbol 420 to total win meter 502, as shown in FIG. 5. When credit prize 504 appears to reach total win meter 502, a visual highlight may appear around credit prize 504 within total win meter 502. In the example of FIG. 6, the visual highlight around credit prize 504 is shown as a circle 601 drawn around credit prize 504 displayed by total win meter 502. At the conclusion of the animation of credit prize 504, credit prize 504 may appear to be within total win meter 502, as shown in FIG. 7. In some examples, the animation of credit prize 504 may have an alternative appearance than as shown in FIGS. 5-7 and is not limited to the examples as shown.

FIG. 8 is an example user interface or screenshot 800 of the base game of the exemplary electronic game, continuing the example shown in FIG. 4. As shown in FIG. 8, game controller 202 (shown in FIG. 2A) may determine a winning combination of symbols including dual symbol 420 across reels 402-410 when the wild feature of dual symbol 420 is activated. The activation of the wild feature of dual symbol 420 may be separate from the activation of the prize feature of dual symbol 420, in that dual symbol 420 acting as a wild symbol to complete a winning combination of symbols on reels 402-410 may not involve the triggering of the credit prize 504 indicated on dual symbol 420. In the example of FIG. 8, a first dual symbol 802 and a second dual symbol 804 act as wild symbols to complete the winning combination of symbols along row 414 of reels 402-410 (e.g., a combination of four 'mouse' symbols). However, in the example of FIG. 8, credit prize 504 of 10 K and 15 K of first dual symbol 802 and second dual symbol 804, respectively, is not triggered due to an absence of trigger symbol 422 in row 414. Thus, in the example of FIG. 8, first dual symbol 802 and second dual symbol 804 are acting as wild symbols but not as credit on reel symbols.

Figure 9:
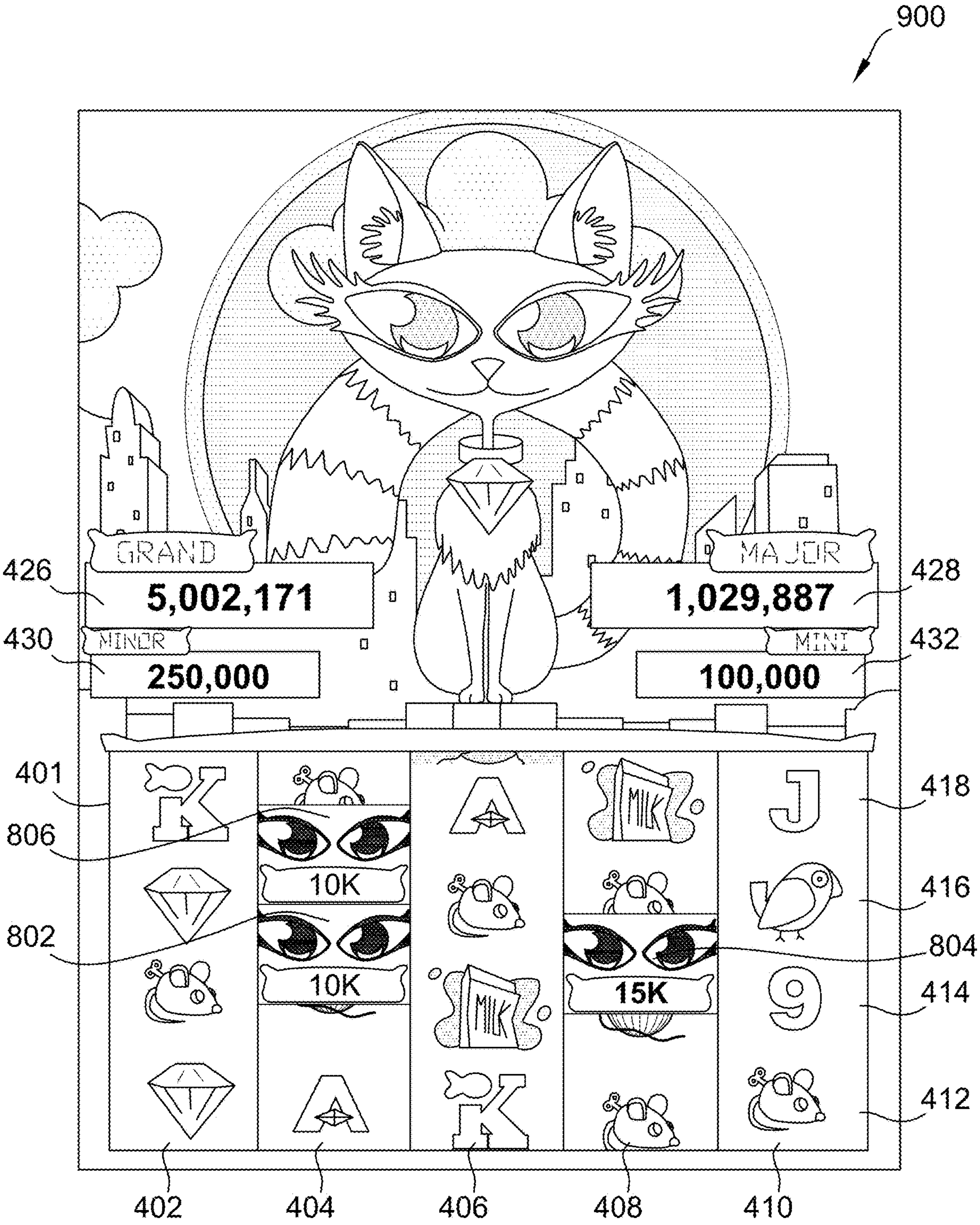
Figure 10:
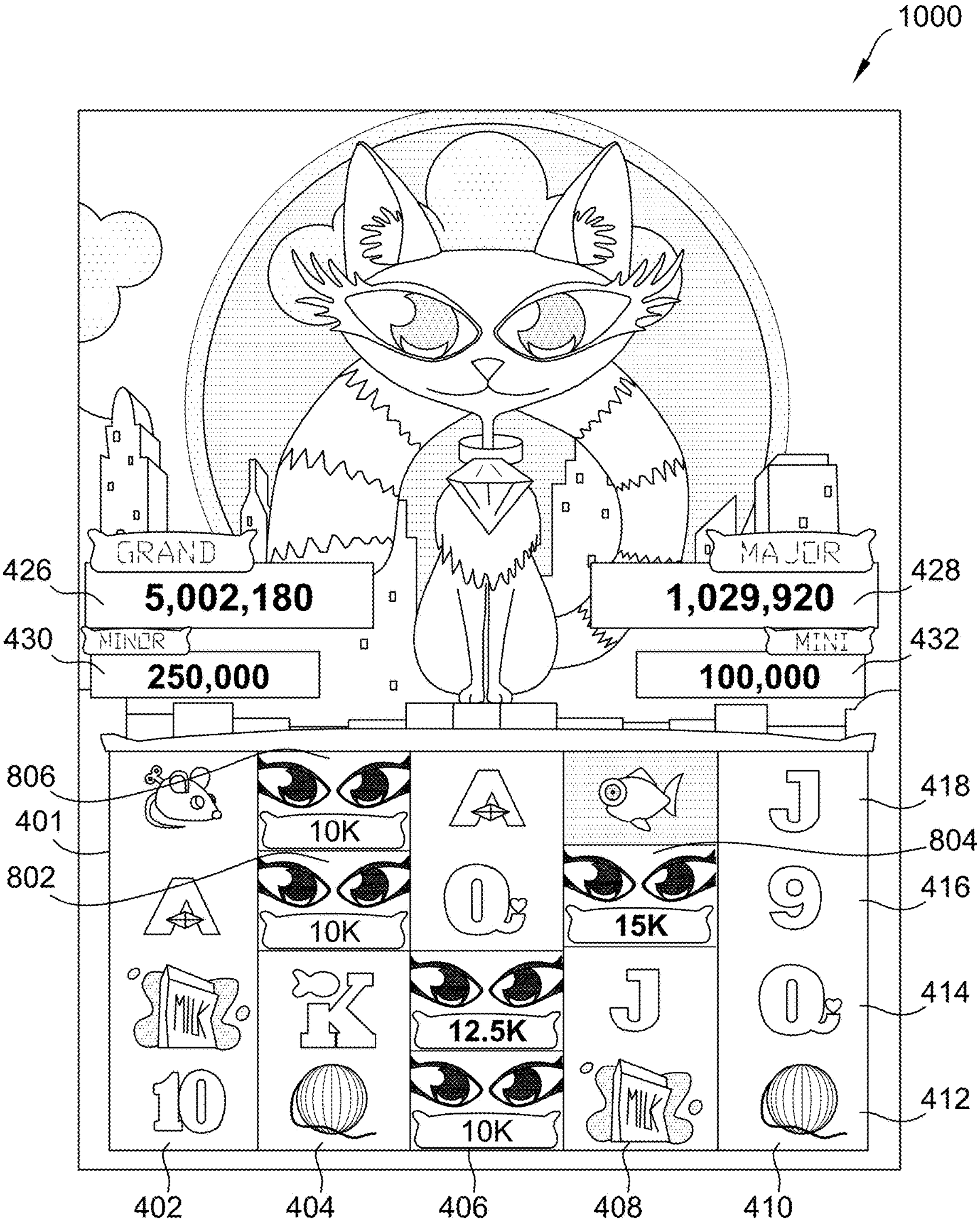

FIGS. 9-10 are example user interfaces or screenshots 900-1000 of the base game of the exemplary electronic game, continuing the example shown in FIG. 8. During game play of the base game, in response to initiation of a spin of reels 402-410, game controller 202 (shown in FIG. 2A) may cause to be displayed the plurality of symbols in a plurality of base symbol positions in rows 412-418. The plurality of base symbol positions may be determined randomly based on an RNG (such as in a Class III game) or as part of a facade based on a winning bingo pattern (such as in a Class II game). Game controller 202 may cause to be displayed dual symbol 420 among the plurality of symbols in an initial dual symbol position. A subsequent dual symbol position may be determined separately from the plurality of base symbol positions. During game play of the base game, game controller 202 may cause to be displayed dual symbol 420 in the subsequent dual symbol position located one row above the initial dual symbol position. Thus, dual symbol 420 may be displayed in multiple subsequent dual symbol positions as dual symbol 420 travels upwards one row (e.g., in an upwardly direction) of rows 412-418 with each spin of reels 402-410, allowing dual symbol 420 to persist through multiple spins of reels 402-410.

In the example of FIG. 8, the initial dual symbol position is row 414 for first dual symbol 802 and second dual symbol 804 and row 416 for third dual symbol 806. As shown in FIG. 9, in response to initiation of a spin of reels 402-410, the subsequent dual symbol positions of first dual symbol 802, second dual symbol 804, and third dual symbol 806 are determined separately from the plurality of base symbol positions. In the example of FIG. 9, this separate determination of subsequent dual symbol positions is shown as the plurality of symbols appearing to spin on reels 402-410 behind first dual symbol 802, second dual symbol 804, and third dual symbol 806 as first dual symbol 802, second dual symbol 804, and third dual symbol 806 appear to travel upwards by one row from the initial dual symbol positions.

In the example of FIG. 10, first dual symbol 802, second dual symbol 804, and third dual symbol 806 are displayed one above the rows as shown in FIG. 8, after the spin of reels 402-410 concludes, with first dual symbol 802 and second dual symbol 804 displayed in row 416 and third dual symbol 806 displayed in row 418. Dual symbol 420 may appear to travel upwards by one row of rows 412-418 with each spin of reels 402-410 until dual symbol 420 moves up from row 418 and off of reels 402-410. In some examples, the subsequent dual symbol position is not limited to the examples as discussed and game controller 202 may cause to be displayed the subsequent dual symbol position as any base symbol position (such as, but not limited to, the dual symbol moving more than one row in an upwards or downwards direction, moving side to side, moving to any other base symbol position, and/or staying in the same position).

During the separate determination of the subsequent dual symbol position from the plurality of base symbol positions, game controller 202 may cause to be displayed a dynamic symbol as a replacement of a wild symbol if the wild symbol is positioned to land in a base symbol position already designated as a dual symbol position (e.g., dynamic position) for dual symbol 420 persisting between reel spins. For example, during the separate determination of the subsequent dual symbol positions of first dual symbol 802, second dual symbol 804, and third dual symbol 806, shown in FIG. 9, a dynamic symbol (such as a "mouse" symbol) may be displayed as a replacement of a wild symbol. This replacement may be displayed if the wild symbol is positioned to land in row 416 and/or row 418 where first dual symbol 802, second dual symbol 804, and third dual symbol 806 are set to land when persisting between reel spins. The dynamic symbol may appear as any of the non-wild symbols of the plurality of symbols to avoid dual symbol 420 appearing to cover a wild symbol and take away a potential prize when dual symbol 420 persists between reel spins. The game controller 202 may cause to be displayed the replacement of the wild symbol with the dynamic symbol during the spin of reels 402-410 (e.g., when the base game outcome is being anticipated but before the base game outcome is caused to be displayed). Alternatively, if dual symbol 420 is positioned to land in a base symbol position already designated as an initial dual symbol position of a separate one of dual symbol 420, dual symbol 420 may appear to be replaced with a 2× multiplier symbol that may be applied to any symbol combination award including the 2× multiplier symbol.

Figure 11:
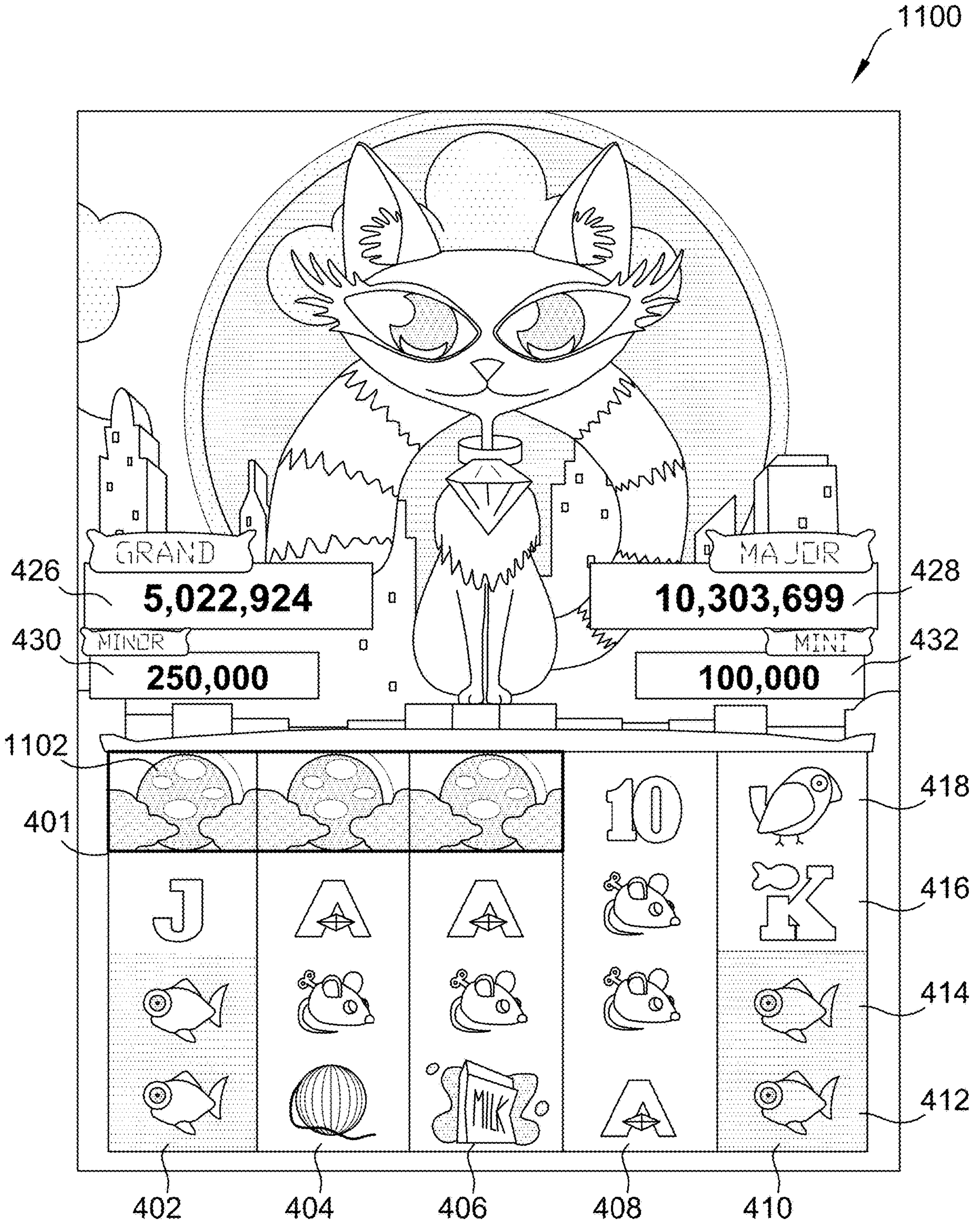

FIG. 11 is an example user interface or screenshot 1100 of the base game of the exemplary electronic game, continuing the example shown in FIG. 4. The plurality of symbols caused to be displayed by game controller 202 (shown in FIG. 2A) may include a bonus symbol 1102. In the example of FIG. 11, the display of three of bonus symbol 1102 may cause game controller 202 to initiate a bonus game of bonus spins. In some examples, the number of bonus symbol 1102 displayed on reels 402-410 to trigger the initiation of the bonus game may vary and/or may determine the number of bonus spins of the bonus game. In other examples, the bonus game may include triggers other than bonus spins (such as, but not limited to, multipliers and/or pick icons). In the example of FIG. 11, three of bonus symbol 1102 are displayed in row 418 on reels 402, 404, and 406. In some examples, one or more of bonus symbol 1102 may be displayed on any of reels 402-410 and/or in any of rows 412-418 to trigger the initiation of the bonus game.

During the separate determination of the subsequent dual symbol position from the plurality of base symbol positions, game controller 202 may cause to be displayed the dynamic symbol as a replacement of bonus symbol 1102 if bonus symbol 1102 is positioned to land in a base symbol position already designated as the subsequent dual symbol position (e.g., dynamic position) for dual symbol 420 persisting between reel spins. The dynamic symbol may appear as any of the non-bonus symbols of the plurality of symbols to avoid dual symbol 420 appearing to cover bonus symbol 1102 and take away a potential for the initiation of a bonus game of bonus spins when dual symbol 420 persists between reel spins. The game controller 202 may cause to be displayed the replacement of bonus symbol 1102 with the dynamic symbol during the spin of reels 402-410. In some examples, game controller 202 may cause the evaluation of bonus symbol 1102 prior to the replacement of bonus symbol 1102 with the dynamic symbol, allowing the position on reels 402-410 to be counted as bonus symbol 1102 as well as dual symbol 420.

Figure 12:
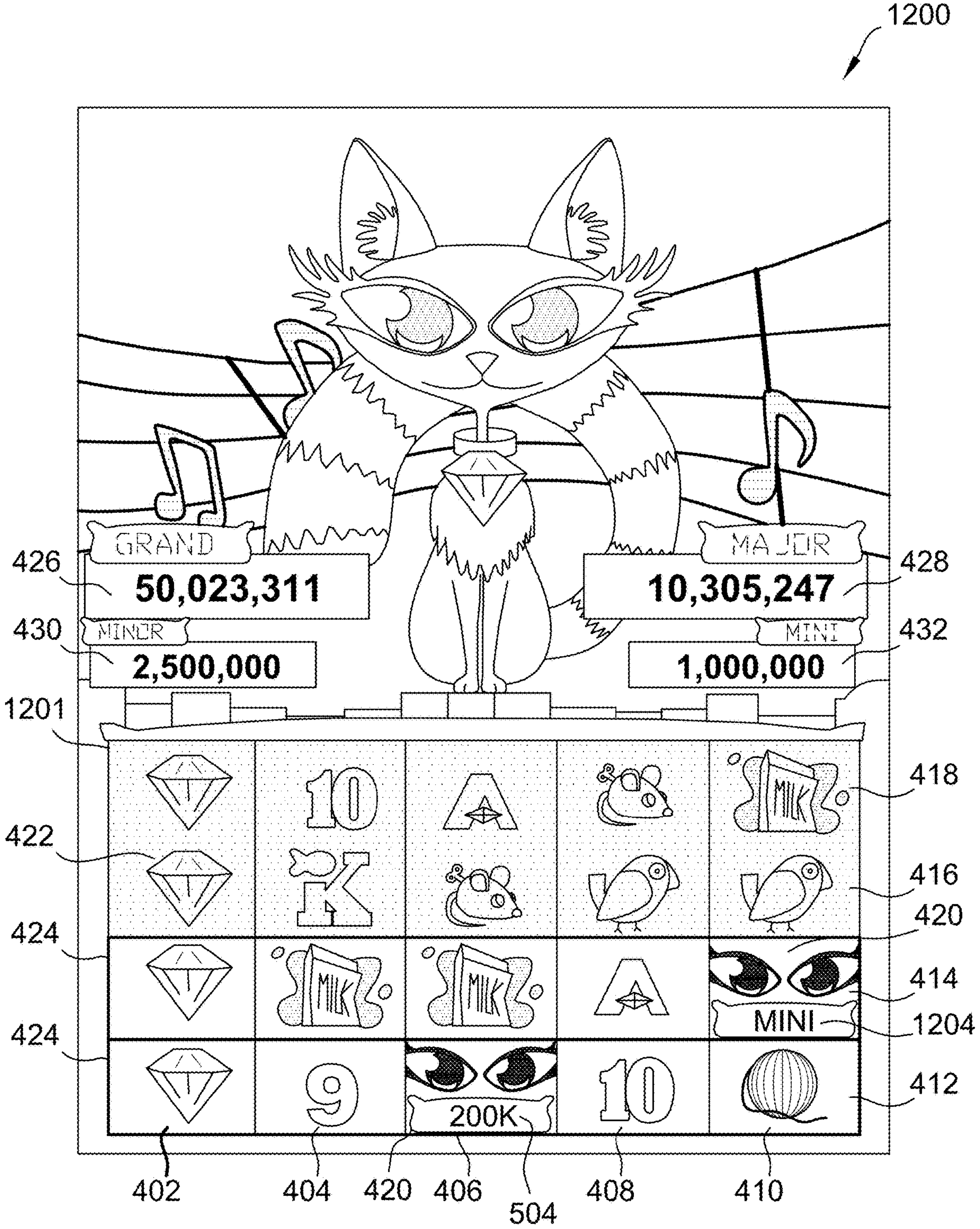
FIG. 12 is an example user interface or screenshot of a bonus game of the example electronic game shown in FIG. 4 in accordance with the present disclosure.

FIG. 12 is an example user interface or screenshot 1200 of a bonus game of the exemplary electronic game in accordance with the present disclosure. In the example of FIG. 12, reels 402-410 are displayed in a secondary game display area 1201 of a gaming device (e.g., gaming devices 104A-104X, 256, and/or 264*a*-264*c*) by a game controller (e.g., game controller 202) for bonus spins of the bonus game. Game controller 202 (shown in FIG. 2A) may cause to be displayed jackpot meters 426-432 in secondary game display area 1201. In operation of the bonus game, the plurality of symbols on reels 402-410 may include dual symbol 420 and/or trigger symbol 422. As in the base game, the prize feature of dual symbol 420 in the bonus game may indicate a prize (e.g., bonus credit prize) including credit prize 504 and/or jackpot prize 1204. In the example of FIG. 12, the prize feature of dual symbol 420 in row 412 is credit prize 504 of 200 K and the prize feature of dual symbol 420 in row 414 is jackpot prize 1204 associated with mini jackpot meter 432. Although jackpot prize 1204 is only shown in FIG. 12 in relation to the bonus game, jackpot prize 1204 is an available prize feature of dual symbol 420 in both the base game and the bonus game of the exemplary electronic game in accordance with the present disclosure.

Figure 13:
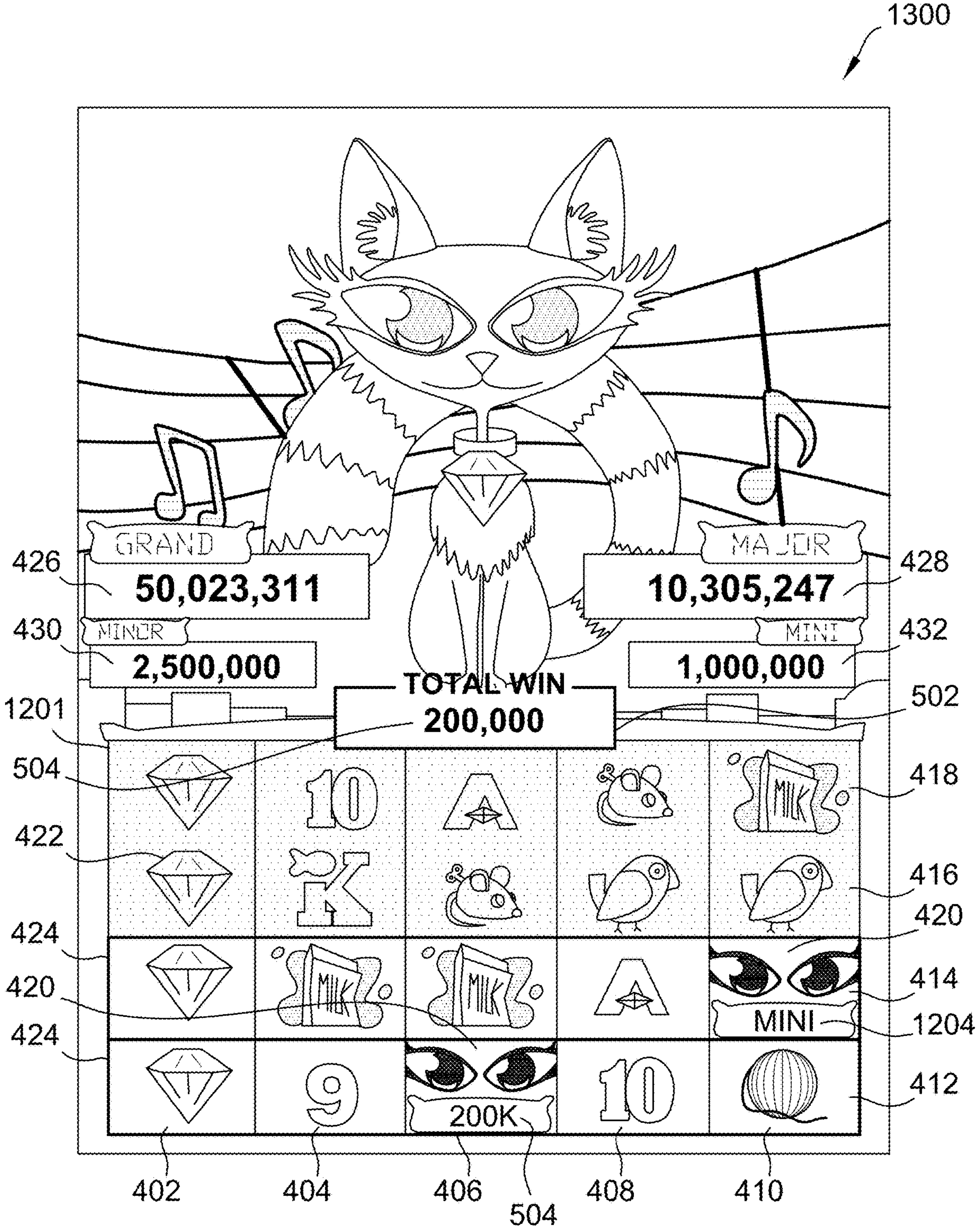
FIGS. 13-18 are example user interfaces or screenshots of the bonus game shown in FIG. 12.
Figure 14:
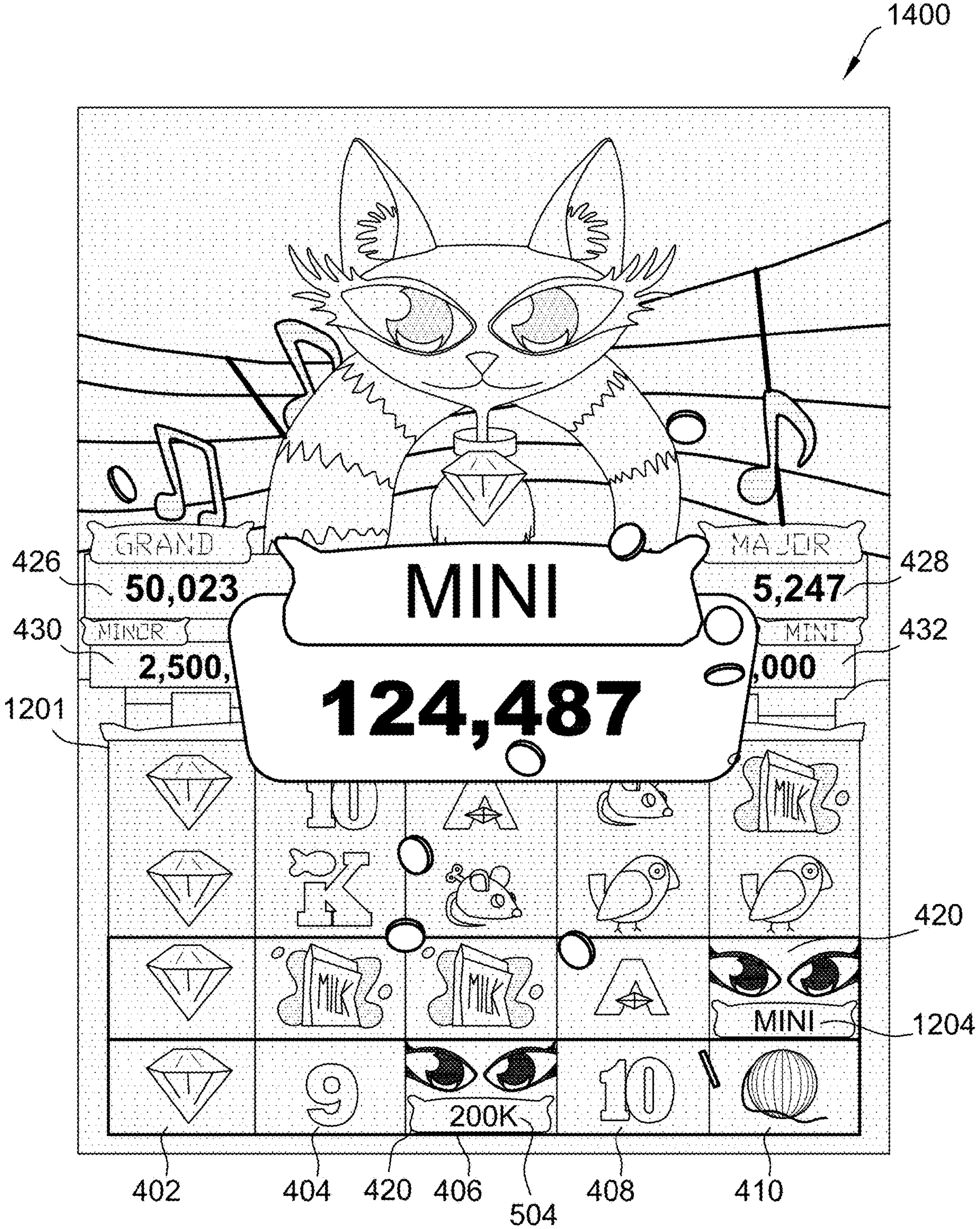

FIGS. 13-14 are example user interfaces or screenshots 1300-1400 of the bonus game of the exemplary electronic game, continuing the example shown in FIG. 12. In the example of FIG. 12, each of the prize features of dual symbol 420 in rows 412 and 414 are activated due to the presence of trigger symbol 422 in rows 412 and 414. As in the base game, game controller 202 (shown in FIG. 2A) may cause to be displayed total win meter 502 when the prize feature of dual symbol 420 is activated to communicate an award amount from one or more of dual symbol 420 that has been triggered, as shown in FIG. 13. In some examples, one or more than one of dual symbols 420 may be triggered. In the example of FIG. 13, credit prize 504 of 200 K is displayed within total win meter 502. In some examples, game controller 202 may cause to be displayed an animation of credit prize 504 in the bonus game, with an appearance similar to the base game, to communicate the inclusion of credit prize 504 in the amount to be awarded from one or more of dual symbol 420 that has been triggered. In other examples, the animation of credit prize 504 may have an alternative appearance than as in the base game.

As shown in FIG. 14, game controller 202 may cause to be displayed a jackpot animation of jackpot prize 1204 when the prize feature of dual symbol 420 is activated to communicate a jackpot amount to be awarded from one or more of dual symbol 420 that has been triggered. In the example of FIG. 14, game controller 202 causes to be displayed the jackpot animation appearing as an overlay animation on top of secondary game display area 1201 with secondary game display area 1201 appearing dimmed in the background. In some examples, the jackpot animation may have an alternative appearance than as shown in FIG. 14 and is not limited to the example as shown.

Figure 15:
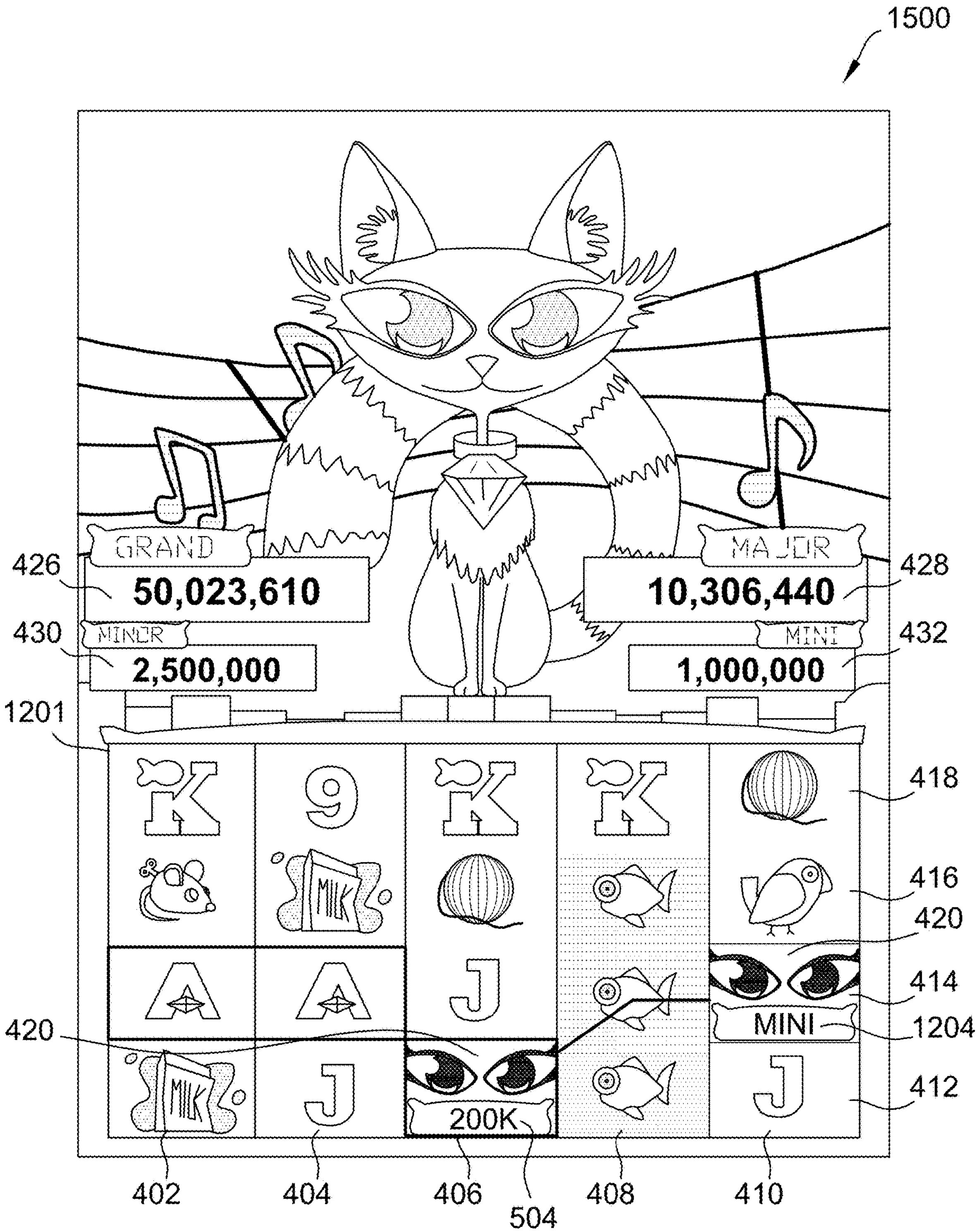

FIG. 15 is an example user interface or screenshot 1500 of the bonus game of the exemplary electronic game. As shown in FIG. 15, game controller 202 (shown in FIG. 2A) may determine a winning combination of symbols including dual symbol 420 across reels 402-410 when the wild feature of dual symbol 420 is activated. The activation of the wild feature of dual symbol 420 may be separate from the activation of the prize feature of dual symbol 420, in that dual symbol 420 acting as a wild symbol to complete a winning combination of symbols on reels 402-410 may not involve the triggering of the credit prize 504 or jackpot prize 1204 indicated on dual symbol 420. In the example of FIG. 15, dual symbol 420 on reel 406 in row 412 acts as a wild symbol to complete the winning combination of symbols along rows 412 and 414 (e.g., three 'Aces'), but credit prize 504 of 200 K is not triggered due to an absence of trigger symbol 422 in row 412. Thus, in the example of FIG. 15, dual symbol 420 in row 412 acts as a wild symbol but not as a credit on reel symbol.

Figure 16:
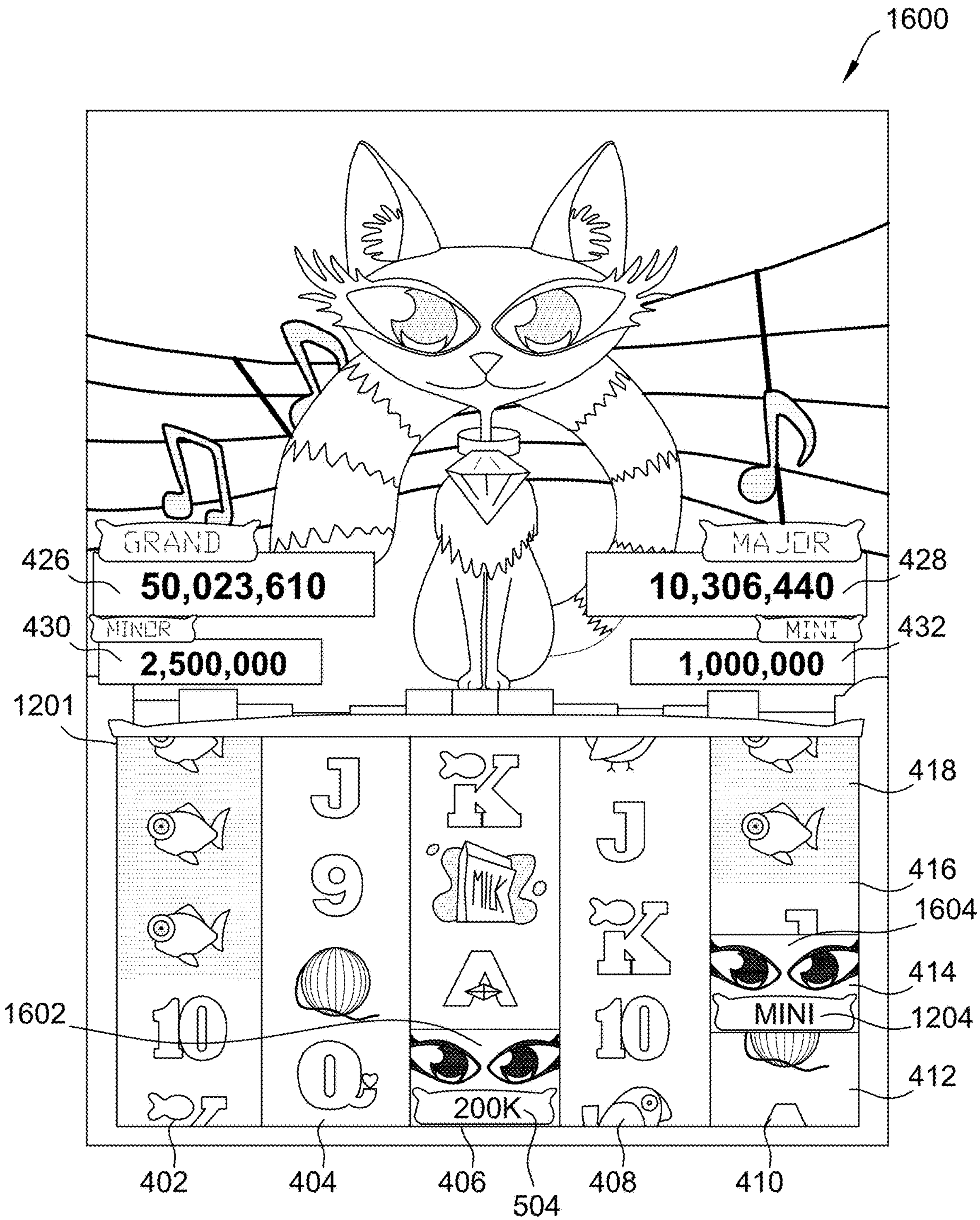

FIG. 16 is an example user interface or screenshot 1600 of the bonus game of the exemplary electronic game, continuing the example shown in FIG. 15. During game play of the bonus game, as in the base game, in response to initiation of a spin of reels 402-410, game controller 202 (shown in FIG. 2A) may cause to be displayed the plurality of symbols in a plurality of base symbol positions in rows 412-418. The plurality of base symbol positions may be determined randomly based on an RNG (such as in a Class III game) or as part of a facade based on a winning bingo pattern (such as in a Class II game). Game controller 202 may cause to be displayed dual symbol 420 among the plurality of symbols in an initial dual symbol position. A subsequent dual symbol position may be determined separately from the plurality of base symbol positions. During game play of the bonus game, game controller 202 may cause to be displayed dual symbol 420 in the subsequent dual symbol position in the same position as the initial dual symbol position. Thus, dual symbol 420 may appear to not change positions (e.g., stick) with subsequent spins of reels 402-410, allowing dual symbol 420 to persist through multiple spins of reels 402-410.

In the example of FIG. 16, the initial dual symbol position is row 412 for a first bonus dual symbol 1602 and row 414 for a second bonus dual symbol 1604. As shown in FIG. 16, in response to initiation of a spin of reels 402-410, the subsequent dual stop positions of first bonus dual symbol 1602 and second bonus dual symbol 1604 are determined separately from the plurality of base symbol positions. In the example of FIG. 16, this separate determination of subsequent dual symbol positions is shown as the plurality of symbols appearing to spin on reels 402-410 behind first bonus dual symbol 1602 and second bonus dual symbol 1604 as first bonus dual symbol 1602 and second bonus dual symbol 1604 remain stationary (e.g., stick).

During the separate determination of the subsequent dual symbol position from the plurality of base symbol positions, game controller 202 may cause to be displayed a dynamic symbol as a replacement of a wild symbol if the wild symbol is positioned to land in a base symbol position already designated as the subsequent dual symbol position (e.g., dynamic position) for dual symbol 420 persisting between reel spins. The dynamic symbol may appear as any of the non-wild symbols of the plurality of symbols to avoid dual symbol 420 appearing to cover a wild symbol and take away a potential prize when dual symbol 420 persists between reel spins. The game controller 202 may cause to be displayed the replacement of the wild symbol with the dynamic symbol during the spin of reels 402-410 (e.g., when the bonus game outcome is being anticipated but before the bonus game outcome is caused to be displayed).

Figure 17:
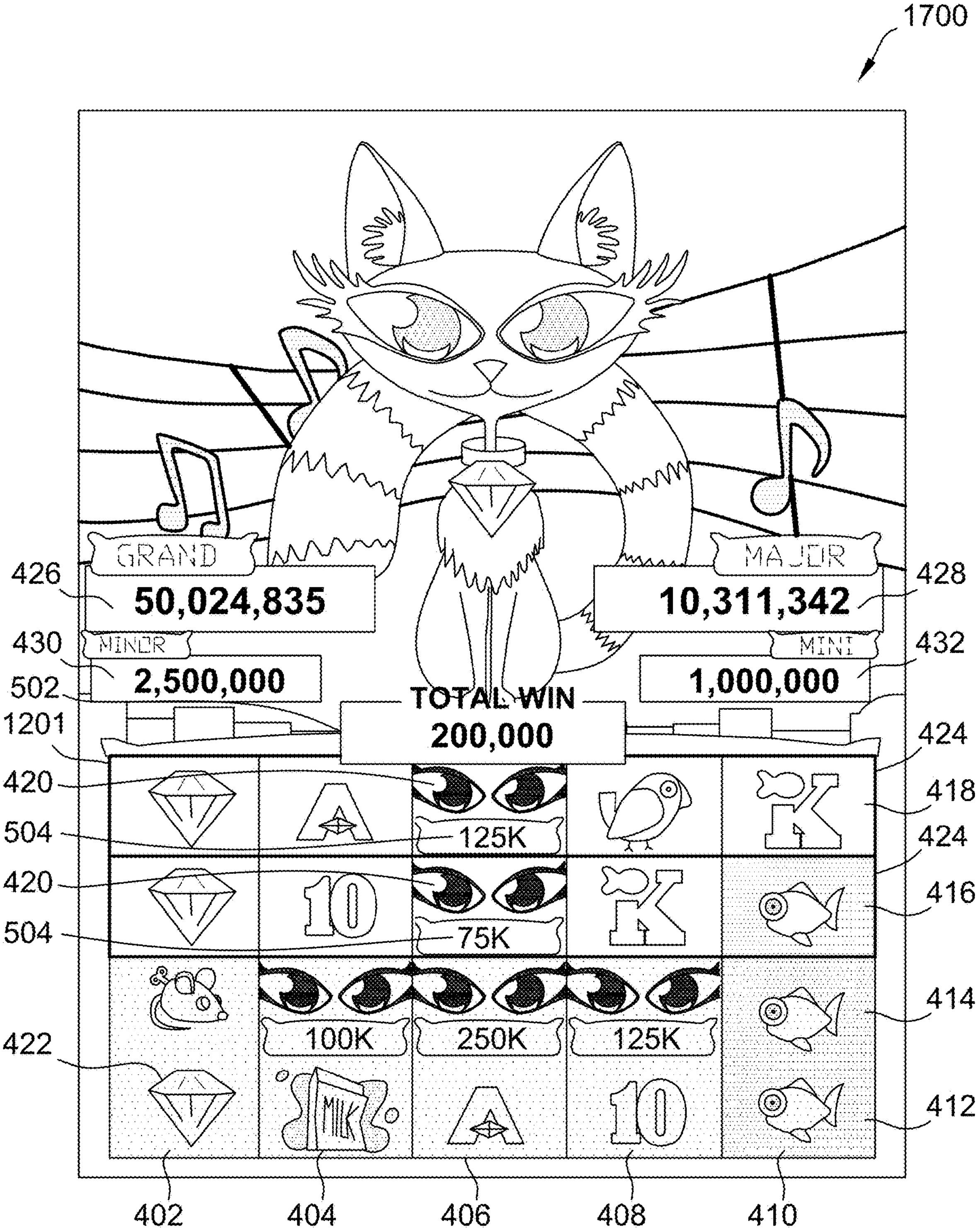

FIG. 17 is an example user interface or screenshot 1700 of the bonus game of the exemplary electronic game. Game controller 202 (shown in FIG. 2A) may cause to be displayed a sum of one or more of credit prize 504 of one or more of dual symbol 420 in total win meter 502. In the example of FIG. 17, total win meter 502 displays 200,000 credits, a sum of credit prize 504 of 125 K included on dual symbol 420 in row 418 and credit prize 504 of 75 K included on dual symbol 420 in row 416, both of which are triggered due to the presence of trigger symbol 422 in rows 416 and 418.

Figure 18:
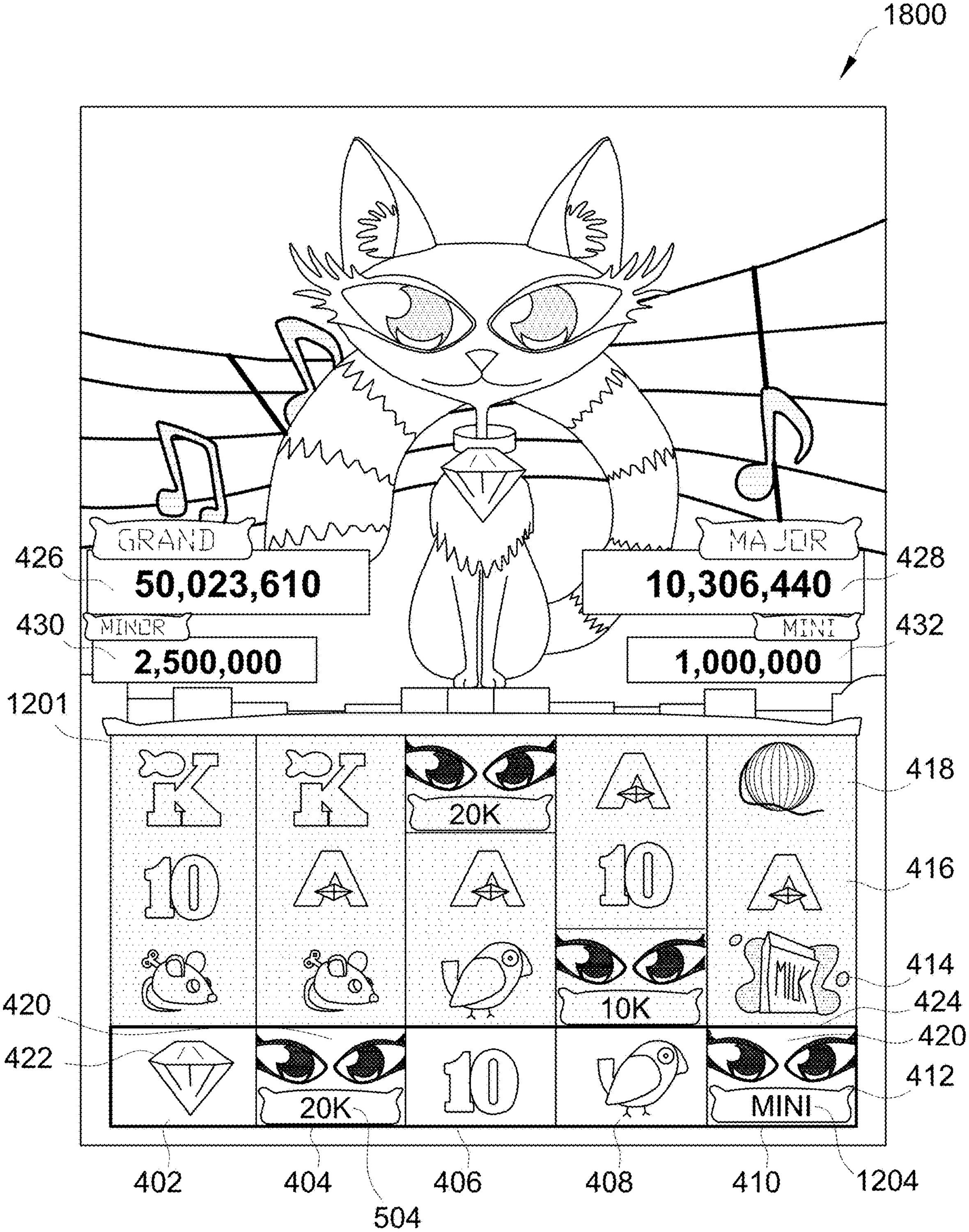

FIG. 18 is an example user interface or screenshot 1800 of the bonus game of the exemplary electronic game. As in the base game, game controller 202 (shown in FIG. 2A) may cause to be displayed one or more of trigger symbol 422 in the bonus game on any of reels 402-410 and/or on a combination of reels 402-410. One of trigger symbol 422 may activate the prize feature of one or more of dual symbol 420, by the display of the one or more of dual symbol 420 and the one of trigger symbol 422 in a shared row of rows 412-218. In the example of FIG. 18, the prize feature of two of dual symbol 420 is activated, one being the credit prize 504 of 20 K and one being the jackpot prize 1204 corresponding to mini jackpot meter 432, by one of trigger symbol 422, all in row 412 as the shared row. The activation of the prize feature of dual symbol 420 may cause game controller 202 to display the shared row as a highlighted row 424 to communicate that the prize feature of dual symbol 420 has been activated. As shown in FIG. 18, highlighted row 424 may appear visibly brighter than the other rows of rows 412-418, with the other rows appearing visibly dimmer and/or "grayed out." Highlighted row 424 may also appear to have a border around the outer edges of the row of symbols across reels 402-410. In some examples, highlighted row 424 may have an alternative appearance.

Figure 19:
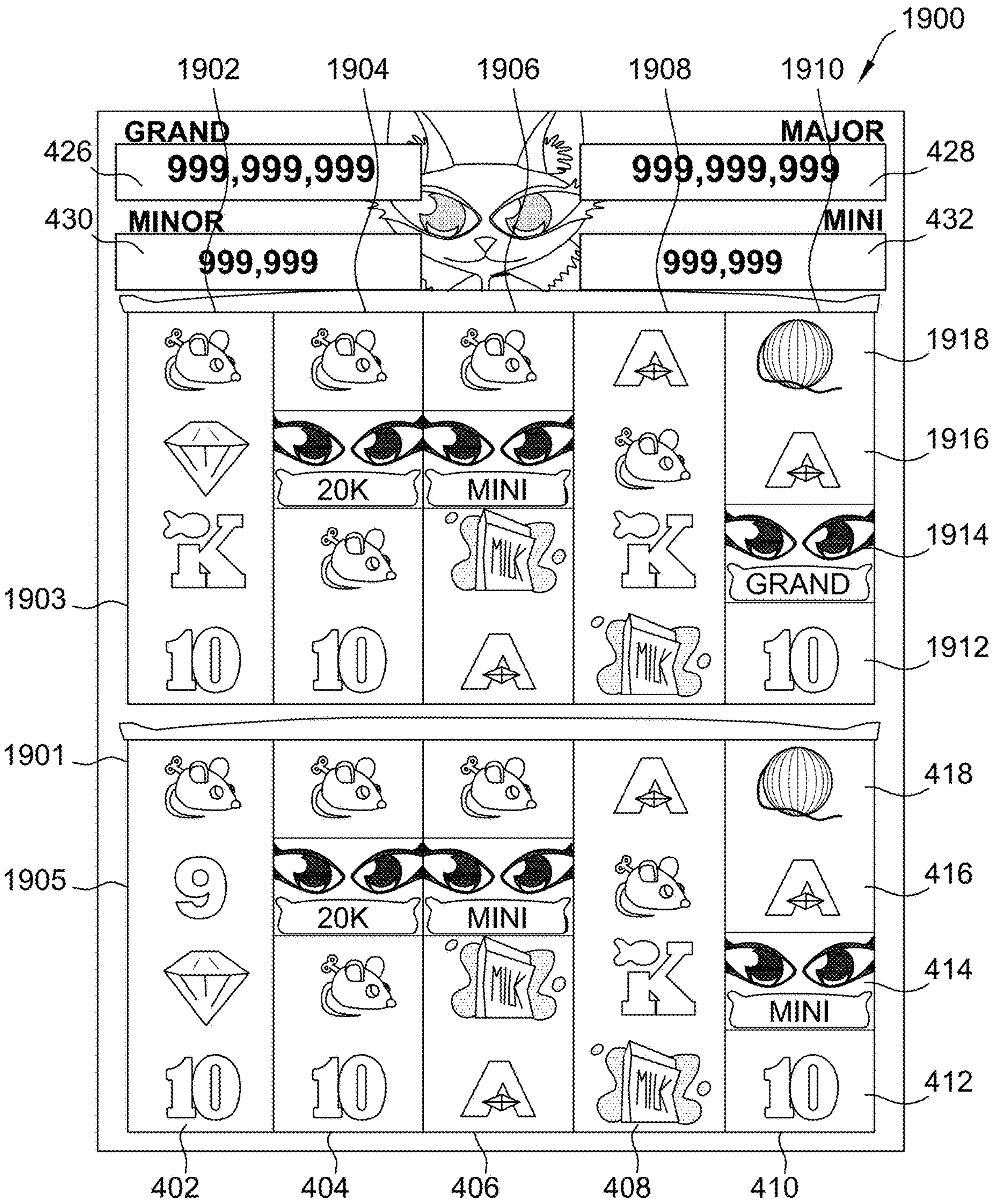
FIGS. 19-24 are example user interfaces or screenshots of a feature game of the example electronic game in accordance with the present disclosure.

FIG. 19 is an example user interface or screenshot 1900 of a feature game of the exemplary electronic game in accordance with the present disclosure. In the example of FIG. 19, reels 402-410 and feature reels 1902-1910 are displayed in a feature game display area 1901 of a gaming device (e.g., gaming devices 104A-104X, 256, and/or 264*a*-264*c*) by a game controller (e.g., game controller 202) for additional spins of the feature game. In some examples, only one reel set of reels 402-410 and/or feature reels 1902-1910 may be displayed in feature game display area 1901 as part of the feature game. Game controller 202 may also cause to be displayed jackpot meters 426-432 in feature game display area 1901.

In the example of FIG. 19, feature rows 1912-1918 of feature reels 1902-1910 are displayed in a top display area 1903, above rows 412-418 of reels 402-410 displayed in a bottom display area 1905, making it appear as though feature reels 1902-1910 are stacked on top of reels 402-410. In the example of FIG. 19, the plurality of symbols displayed on feature reels 1902-1910 are positioned in near-identical positions as the plurality of symbols displayed on reels 402-410, making it appear as though top display area 1903 is almost a duplicate of bottom display area 1905. In some examples, the plurality of symbols displayed on feature reels 1902-1910 may be positioned in different positions than as the plurality of symbols displayed on reels 402-410 (as shown in, and discussed in further detail in reference to, FIG. 22).

Figure 20:
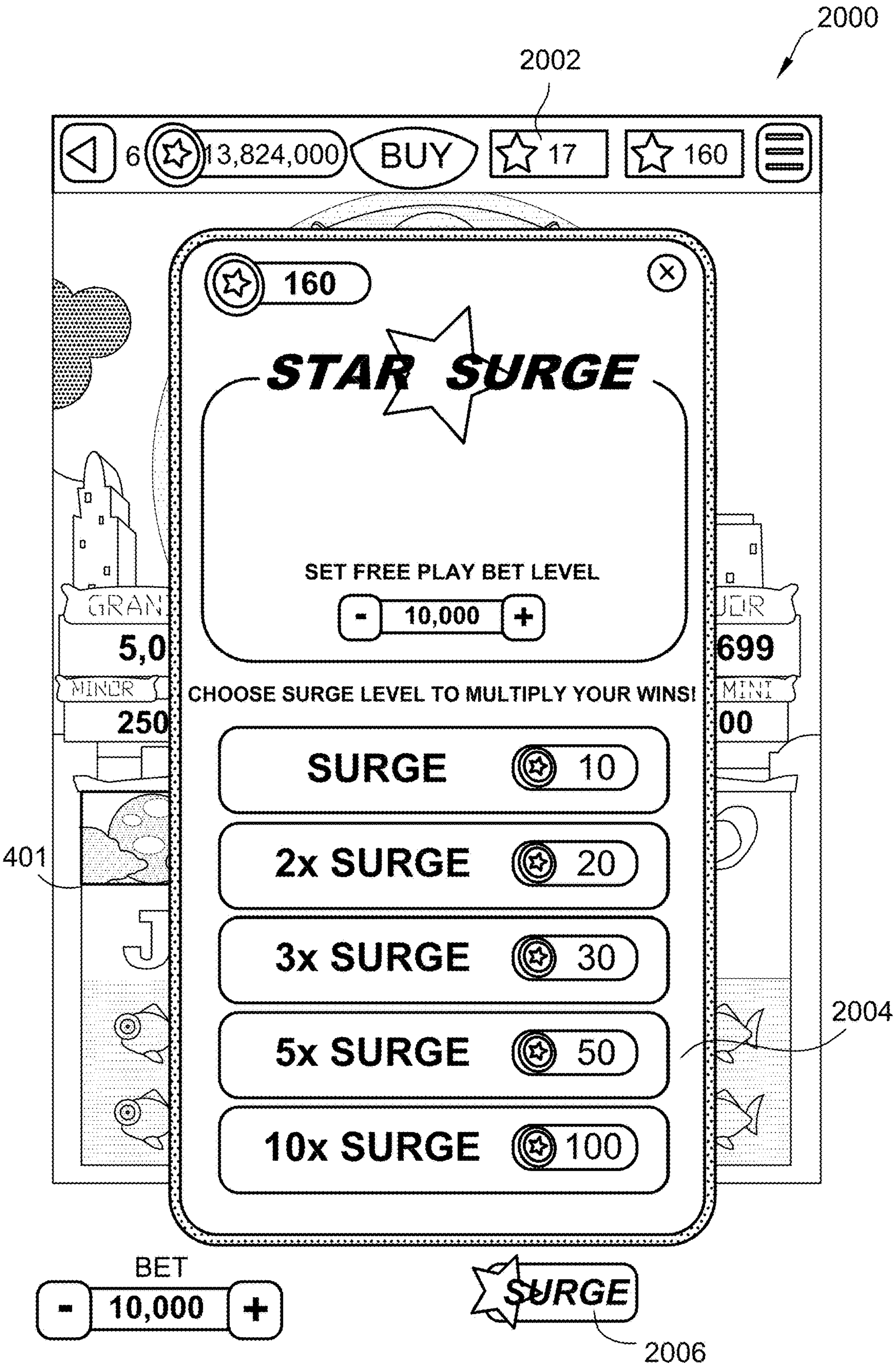
Figure 21:
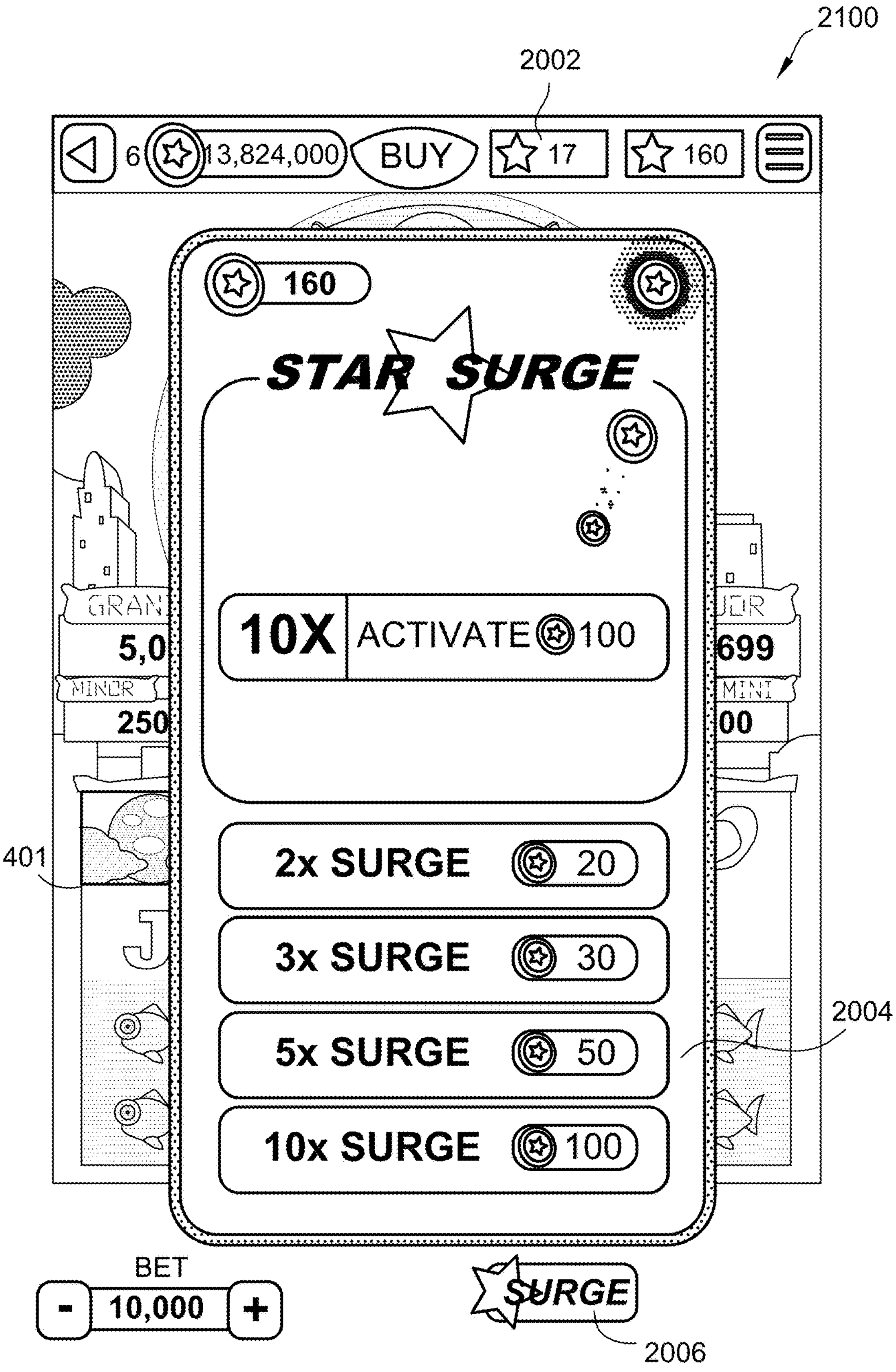

FIGS. 20-21 are example user interfaces or screenshots 2000-2100 of the feature game of the exemplary electronic game. In operation, the feature game may be caused to be initiated by game controller 202 based on a secondary credit "purchase" by a player. For example, a secondary credit symbol (e.g., feature symbol) may be displayed as part of a base game outcome and/or a bonus game outcome (not shown in the figures). The secondary credit symbol may be displayed to appear to match a theme of the feature game, such as a "star" theme. The display of one or more of the secondary credit symbol as part of a base game outcome and/or a bonus game outcome may accumulate a number of secondary credits in a secondary credit counter 2002 (e.g., increment a feature symbol counter). The number of secondary credits in secondary credit counter 2002 (e.g., collected feature symbols) may be used to "purchase" a feature game with a certain number of spins and/or a certain award multiplier, based on the number of secondary credits (e.g., each feature game may be associated with a different number of secondary credits), as displayed by a feature game purchase interface 2004 (e.g., displaying feature game selections) activated by a feature game purchase icon 2006.

Each feature game selection as displayed by feature game purchase interface 2004 may correspond to a multiplier that may be applied to the prize feature of dual symbol 420. For example, a prize feature of dual symbol 420 of 10 K may be displayed as 100 K for a feature game selection corresponding to a 10× multiplier. In some examples, the feature game may be initiated by game controller 202 based on factors other than the secondary credit "purchase" by a player, such as a certain number and/or type of symbol as part of a base/bonus game outcome and/or an additional bet input by the player.

In the example of FIG. 21, the "purchase" of the feature game causes game controller 202 to display an animation that appears as a number of mini secondary credit symbols leaving the secondary credit counter 2002 and moving towards feature game purchase interface 2004. The number of mini secondary credit symbols included in the feature game "purchase" animation may be equal to, and/or a multiple of, the number of secondary credit symbols needed to "purchase" the selected feature game as displayed by feature game purchase interface 2004.

Figure 22:
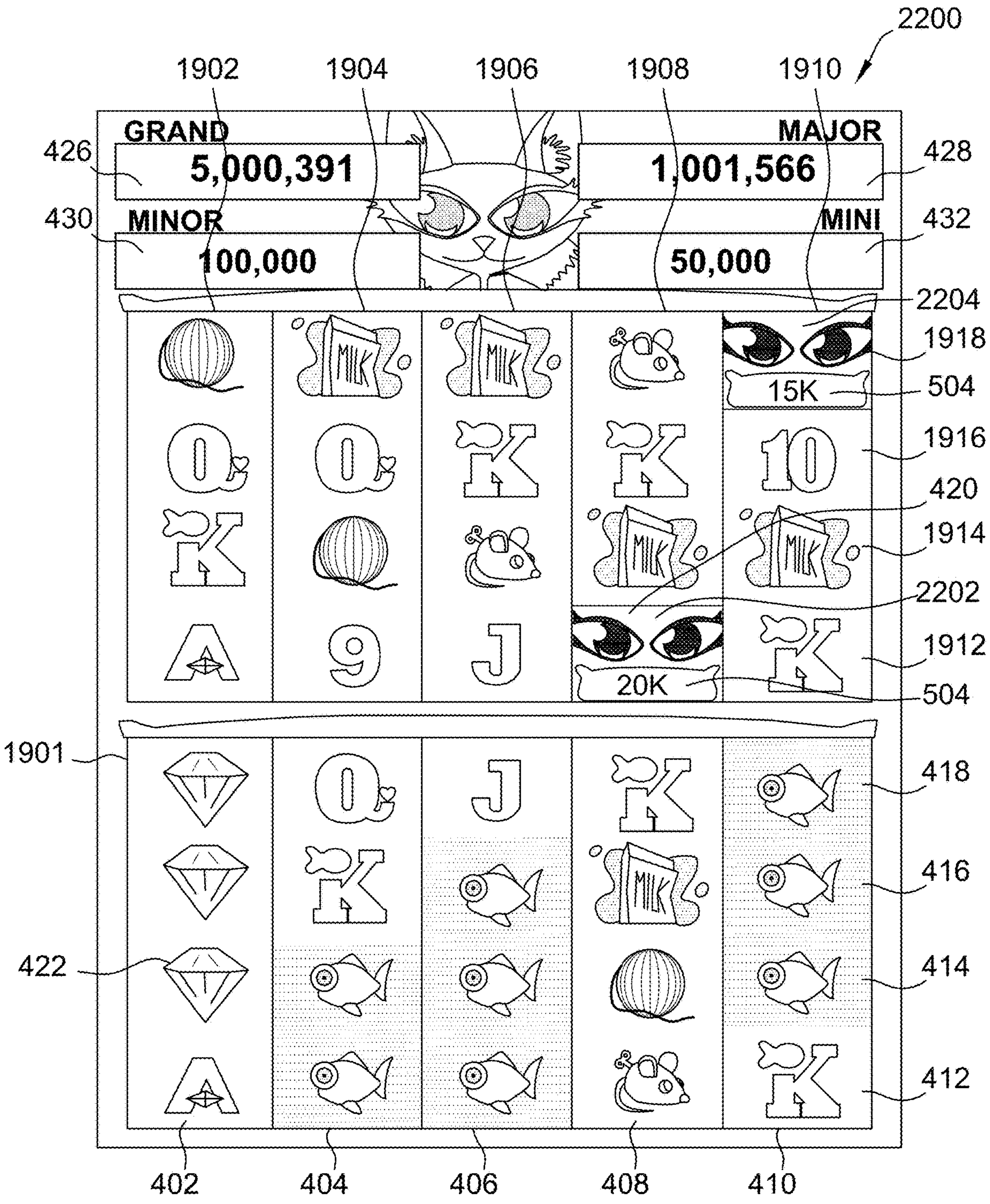
Figure 23:
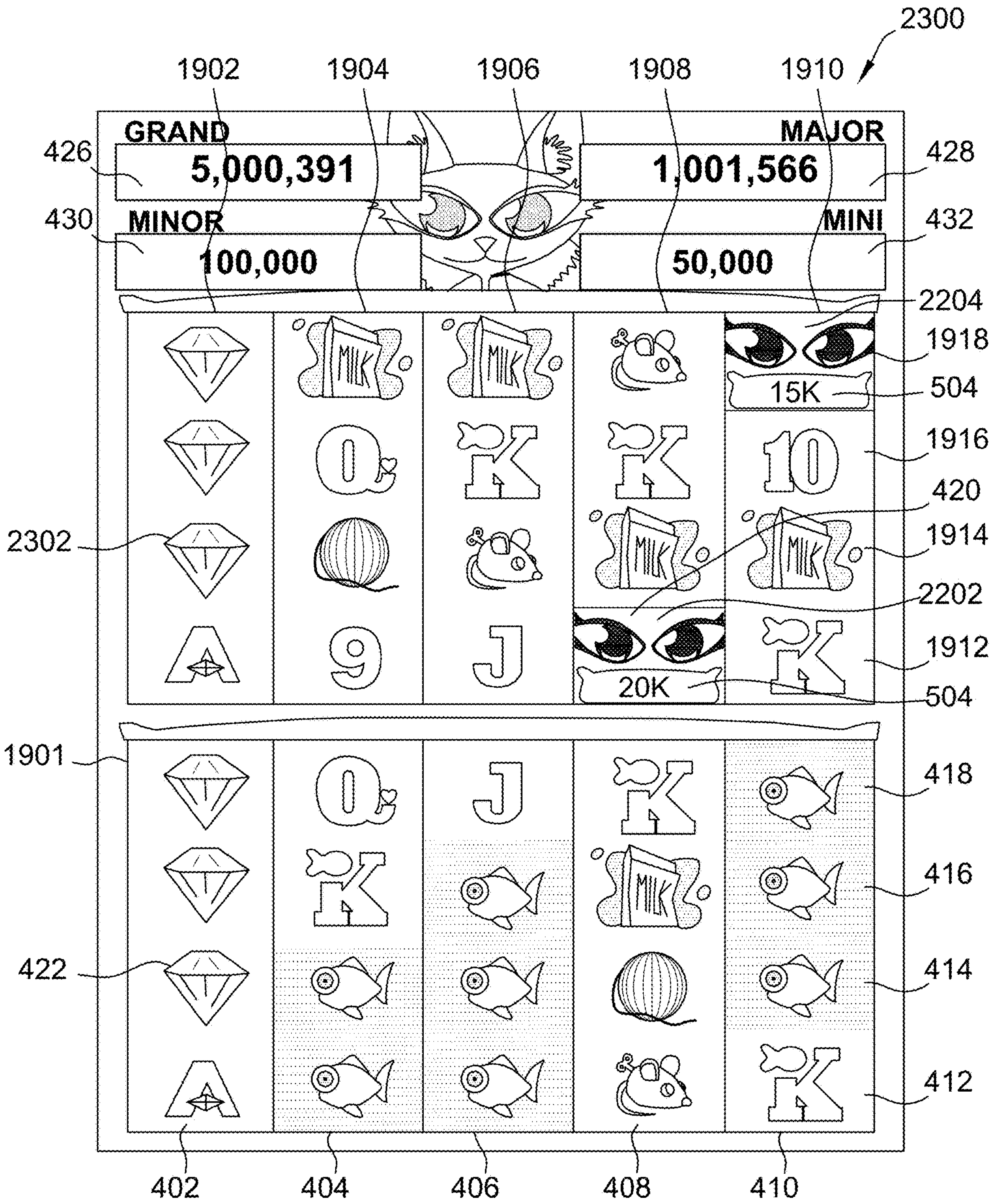
Figure 24:
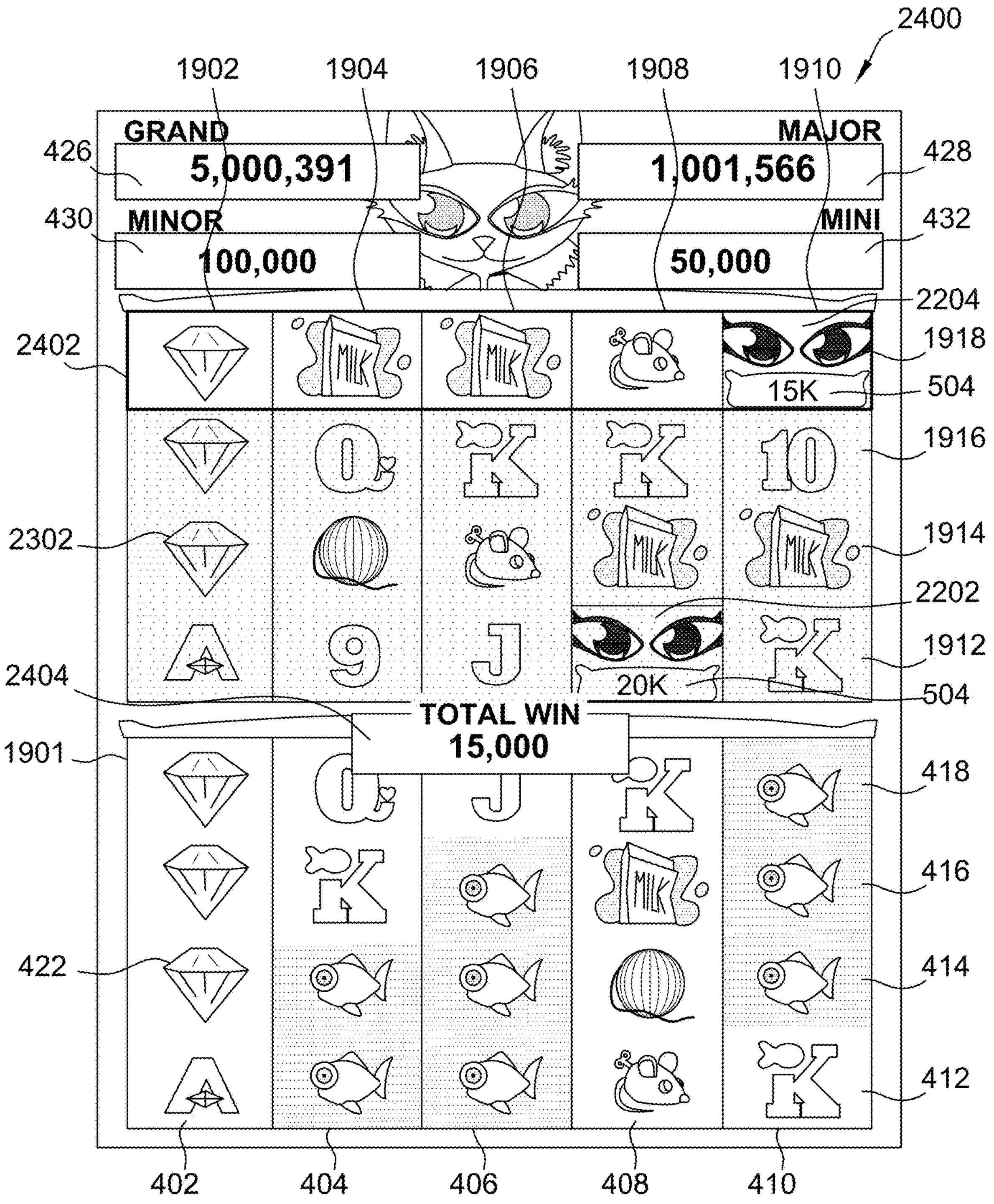

FIGS. 22-24 are example user interfaces or screenshots 2200-2400 of the feature game of the exemplary electronic game. In operation, during game play of the feature game, the plurality of symbols on reels 402-410 and feature reels 1902-1910 may include dual symbol 420 and/or trigger symbol 422, as shown in FIG. 22. Dual symbol 420 and/or trigger symbol 422 may be displayed on one or more reel set of reels 402-410 and feature reels 1902-1910. In the example of FIG. 22, two of dual symbol 420 are displayed on feature reels 1902-1910, a first feature dual symbol 2202 and a second feature dual symbol 2204. Additionally, in the example of FIG. 22, three of trigger symbol 422 are displayed on reels 402-210 in rows 414-418.

As in the base and bonus games, the prize feature of dual symbol 420 in the feature game may indicate a prize including credit prize 504 (e.g., feature credit prize) and/or jackpot prize 1204. Trigger symbol 422 may activate the prize feature of one or more of dual symbol 420, in that the display of trigger symbol 422 and one or more of dual symbol 420 in a shared row of rows 412-418 and/or feature rows 1912-1918 may activate the prize feature of one or more of dual symbol 420. In the example of FIG. 22, the prize feature of first feature dual symbol 2202, credit prize 504 of 20 K, and the prize feature of second feature dual symbol 2204, credit prize 504 of 15 K, are not activated due to an absence of trigger symbol 422 in rows 1912 and 1918.

In operation, during the feature game, the display of trigger symbol 422 on one reel set of reels 402-410 and/or feature reels 1902-1910 may cause game controller 202 to display a mirrored trigger symbol 2302 on the other reel set of reels 402-410 and/or feature reels 1902-1910 in a mirrored row (e.g., a row in the same position of the display matrix of the reel set and thus positioned similarly in the reel sets). For example, mirrored trigger symbol 2302 on feature reels 1902-1910 in row 1914 is a mirror of trigger symbol 422 on reels 402-410 in row 414, in that both mirrored trigger symbol 2302 and trigger symbol 422 are in a mirrored row that is second from the bottom on the respective reel sets. In the example of FIG. 23, three of trigger symbol 422 are displayed on reels 402-410 in rows 414-418, and are mirrored by three of mirrored trigger symbol 2302 displayed on feature reels 1902-1910 in rows 1914-1918.

In some examples, trigger symbol 422 may already be displayed on mirrored rows of reels 402-410 and/or feature reels 1902-1910, prior to the display of mirrored trigger symbol 2302. Thus, instead of the display of mirrored trigger symbol 2302 on one reel set of reels 402-410 and/or feature reels 1902-1910, a multiplier trigger symbol (not shown in figures) including a multiplier may be displayed and activated, such as, but not limited to, a 2× multiplier. Trigger symbol 422 and/or mirrored trigger symbol 2302 in the mirrored rows of reels 402-410 and/or feature reels 1902-1910 may be replaced by the multiplier trigger symbol. Additionally, in some examples, trigger symbol 422 may be displayed in mirrored rows of reels 402-410 and feature reels 1902-1910 as part of the feature game outcome. Thus, trigger symbol 422 displayed in each reel set of reels 402-410 and feature reels 1902-1910 may be replaced by the multiplier trigger symbol. The 2× multiplier may award a player the credit prize 504 multiplied by two (e.g., a multiplier credit prize) and/or jackpot prize 1204 multiplied by two in the mirrored rows. If a player is awarded 2× the jackpot prize 1204, the player may firstly receive the credit prize value displayed by the associated one of jackpot meters 426-432 and then may secondly receive the "reset" base jackpot value of the associated one of jackpot meters 426-432.

In the example of FIG. 24, the prize feature of second feature dual symbol 2204 is activated by the presence of mirrored trigger symbol 2302, both of which are displayed in a shared row, row 1918, of feature reels 1902-1910. The activation of the prize feature of dual symbol 420 during the feature game may cause game controller 202 to display the shared row as a highlighted row 2402, as shown in FIG. 24. In some examples, highlighted row 2402 may have an appearance similar to the highlighted row displayed in the base game and/or the bonus game. In other examples, highlighted row 2402 may have an alternative appearance. As shown in FIG. 24, game controller 202 may cause to be displayed a feature total win meter 2404 when the prize feature of one or more of dual symbol 420 is activated to communicate an award amount from the one or more of dual symbol 420 triggered by trigger symbol 422 and/or mirrored trigger symbol 2302.

During game play of the feature game, as in the base and bonus games, in response to initiation of a spin (e.g., feature spin) of reels 402-410 and feature reels 1902-1910, game controller 202 may cause to be displayed the plurality of symbols in a plurality of base symbol positions in rows 412-418 and feature rows 1912-1918 (e.g., feature game outcome), as shown in FIG. 19. The plurality of symbols in the plurality of base symbol positions may be determined randomly based on an RNG (such as in a Class III game) or as part of a facade based on a winning bingo pattern (such as in a Class II game). Game controller 202 may cause to be displayed dual symbol 420 among the plurality of symbols in an initial dual symbol position. A subsequent dual symbol position may be determined separately from the plurality of base symbol positions. During game play of the feature game, game controller 202 may cause to be displayed dual symbol 420 in the subsequent dual symbol position in the same position as the initial dual symbol position. Thus, dual symbol 420 may appear to not change positions (e.g., stick) with subsequent spins of reels 402-410 and feature reels 1902-1910, allowing dual symbol 420 to persist through multiple spins of reels 402-410 and feature reels 1902-1910.

During the separate determination of the subsequent dual symbol position from the plurality of base symbol positions, game controller 202 may cause to be displayed a dynamic symbol as a replacement of a wild symbol if the wild symbol is positioned to land in a base symbol position already designated as the subsequent dual symbol position (e.g., dynamic position) for dual symbol 420 persisting between reel spins. The dynamic symbol may appear as any of the non-wild symbols of the plurality of symbols (such as, but not limited to, a 'mouse' symbol) to avoid dual symbol 420 appearing to cover a wild symbol and take away a potential prize when dual symbol 420 persists between reel spins. Game controller 202 may cause to be displayed the replacement of the wild symbol with the dynamic symbol during the spin of reels 402-410 and feature reels 1902-1910 (e.g., when the feature game outcome is being anticipated but before the feature game outcome is caused to be displayed). In some examples, if the potential prize of the wild symbol is an improved award as compared to the prize feature of dual symbol 420, game controller 202 may replace dual symbol 420 with the wild symbol to provide the improved award.

The plurality of symbols caused to be displayed by game controller 202 may include a bonus symbol (not shown in FIGS. 22-24). The display of three bonus symbols on reels 402-410 and/or feature reels 1902-1910 may cause game controller 202 to initiate a bonus game of bonus spins. In some examples, reels 402-410 may be evaluated by game controller 202 for three bonus symbols to initiate the bonus game independently from the evaluation by game controller 202 of feature reels 1902-1910. In other examples, reels 402-410 and feature reels 1902-1910 may be evaluated concurrently by game controller 202 for three bonus symbols to initiate the bonus game. In some examples, the number of bonus symbols to trigger the initiation of the bonus game may vary and/or may determine the number of bonus spins of the bonus game.

During the separate determination of the subsequent dual symbol position from the plurality of base symbol positions, game controller 202 may cause to be displayed a dynamic symbol as a replacement of a bonus symbol if the bonus symbol is positioned to land in a base symbol position already designated as the subsequent dual symbol position (e.g., dynamic position) for dual symbol 420 persisting between reel spins. The dynamic symbol may appear as any of the non-bonus symbols of the plurality of symbols to avoid dual symbol 420 appearing to the player to cover bonus symbol 1102 and take away a potential for the bonus game of bonus spins when dual symbol 420 persists between reel spins. Game controller 202 may cause to be displayed the replacement of bonus symbol 1102 with the dynamic symbol during the spin of reels 402-410 and/or feature reels 1902-1910 (e.g., when the feature game outcome is being anticipated but before the feature game outcome is caused to be displayed). In some examples, game controller 202 may evaluate the bonus symbol prior to the replacement of the bonus symbol with the dynamic symbol, allowing the position on reels 402-410 and/or feature reels 1902-1910 to be counted as the bonus symbol as well as dual symbol 420.

During game play of the feature game, game controller 202 may determine a winning a combination of symbols including dual symbol 420 across reels 402-410 and/or feature reels 1902-1910. The activation of the wild feature of dual symbol 420 may be separate from the activation of the prize feature of dual symbol 420, in that dual symbol 420 acting as a wild symbol to complete a winning combination of symbols on reels 402-410 and/or feature reels 1902-1910 may not involve the triggering of credit prize 504 or jackpot prize 1204 indicated on dual symbol 420. In some examples, game controller 202 may determine the winning combination of symbols before the activation of the prize feature of dual symbol 420. In other examples, game controller 202 may determine the winning combination of symbols and/or evaluate reels 402 and/or feature reels 1902-1910 for bonus symbols before the activation of the prize feature of dual symbol 420.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

a display device;

a memory device storing instructions; and a processor in communication with the display device, a random number generator (RNG), and the memory device, wherein the instructions define a symbol determination process configured to be executed by the processor, and, when executed by the processor, cause the processor to:

execute the symbol determination process in association with determining an RNG-based outcome for a base game, including determining a plurality of symbols including a plurality of base game symbols and one or more dual symbols as part of the base game outcome;

determine, in association with a plurality of reels of the base game and as part of the base game outcome, (i) a plurality of base game symbol positions and (ii) a plurality of dual symbol display positions including one or more initial dual symbol display positions and one or more subsequent dual symbol display positions, wherein the one or more subsequent dual symbol display positions are determined in response to initiation of a spin of the plurality of reels and separate from the plurality of base game symbol positions and in association with a persistence characteristic of the one or more subsequent dual symbol display positions, and wherein each of the one or more dual symbols includes both a prize function and a wild function, each of the prize function and the wild function configured to be activated by the processor independent of the other;

cause, as part of the base game outcome, the one or more dual symbols to be displayed in the one or more initial dual symbol display positions and to remain displayed within a display matrix associated with the plurality of reels in the one or more subsequent dual symbol display positions between reel spins of the plurality of reels based on the persistence characteristic;

prior to the display of the base game outcome on the display device, (i) determine, as part of the symbol determination process, that a first designated symbol will land in a respective dual symbol display position of the one or more subsequent dual symbol display positions, and (ii) dynamically replace each first designated symbol determined as part of the symbol determination process to land in the one or more subsequent dual symbol display positions with a replacement symbol, thereby causing the replacement symbol to be displayed at each respective dual symbol display position instead of the first designated symbol during each reel spin of the plurality of reels of the base game as part of the base game outcome; and control display of the base game outcome on the display device including display of the plurality of base game symbols and the one or more dual symbols such that each replacement symbol is displayed at each respective dual symbol display position of the one or more subsequent dual symbol display positions when the base game outcome is being anticipated but before the base game outcome showing the one or more dual symbols in the one or more subsequent dual symbol display positions is caused to be displayed, wherein the activation by the processor of the wild function of each of the one or more dual symbols is performed separate from the activation by the processor of the prize function of each of the one or more dual symbols so that each of the one or more dual symbols functions as a wild symbol independent from functioning as a prize symbol.

2. The electronic gaming device of claim 1, wherein the base game outcome includes a first base game outcome and a second base game outcome, and wherein the instructions, when executed by the processor, further cause the processor to:

determine the second base game outcome for display on the display device, the second base game outcome being subsequent to the first base game outcome; and cause a first dual symbol of the one or more dual symbols displayed in a first dual symbol display position of the first base game outcome to move upwardly to a second dual symbol display position of the second base game outcome, wherein the second dual symbol display position is located one row above the first dual symbol display position in the display matrix.

3. The electronic gaming device of claim 2, wherein the first base game outcome includes the first dual symbol display position as one of the one or more initial dual symbol display positions, the second base game outcome includes the second dual symbol display position as one of the one or more subsequent dual symbol display positions, and the instructions, when executed by the processor, further cause the processor to:

prior to upwardly moving the first dual symbol, evaluate the second base game outcome including determining that a second dual symbol of the one or more dual symbols included on one of the plurality of reels will be displayed in the second dual symbol display position; and upwardly move the first dual symbol from the first dual symbol display position to the second dual symbol display position.

4. The electronic gaming device of claim 1, wherein the instructions, when executed by the processor, further cause the processor to:

determine, as part of the symbol determination process and for a bonus game associated with the base game, a trigger symbol for landing in a same row as one of the one or more dual symbols; and activate, in association with the trigger symbol, the prize function of the one of the one or more dual symbols for awarding a credit prize based on a value shown on the one of the one or more dual symbols.

5. The electronic gaming device of claim 1, further including a bonus game associated with the base game, wherein the instructions, when executed by the processor, further cause the processor to:

determine a plurality of bonus game symbols from the plurality of symbols;

prior to a bonus game outcome being displayed on the display device, determine that a wild or bonus symbol of the plurality of bonus game symbols of the bonus game outcome will be displayed in a first dual symbol display position of a first dual symbol of one or more bonus game dual symbols of the plurality of bonus game symbols of the bonus game outcome;

in response to the determination that the wild or bonus symbol will be displayed in the first dual symbol display position, dynamically replace the wild or bonus symbol with another symbol of the plurality of bonus game symbols; and cause the bonus game outcome to be displayed on the display device with the another symbol.

6. The electronic gaming device of claim 5, wherein the instructions, when executed by the processor, further cause the processor to:

activate the wild function of the one or more bonus game dual symbols so that each of the one or more bonus game dual symbols acts as a wild symbol including evaluating the display matrix of the bonus game by comparing the plurality of bonus game symbols included in the display matrix for the bonus game to symbol data stored in one or more lookup tables saved in the memory device;

in response to the evaluation, determine a first bonus credit prize to be awarded for the bonus game outcome;

determine that the plurality of bonus game symbols included in the display matrix also includes one or more respective trigger symbols in the same row or rows as the one or more bonus game dual symbols;

in response to the one or more trigger symbols being displayed in the display matrix in the same row or rows as the one or more bonus game dual symbols, activate the prize function of each of the one or more bonus game dual symbols by awarding a second bonus credit prize for the bonus game outcome; and award a combination of the first bonus credit prize and the second bonus credit prize after each spin of the bonus game.

7. The electronic gaming device of claim 1, wherein the instructions, when executed by the processor, further cause the processor to:

determine that the base game outcome includes a feature symbol;

cause a feature game to be initiated;

determine a feature game outcome for display on the display device, the feature game outcome being subsequent to the base game outcome and comprising the plurality of symbols included on the plurality of reels in the display matrix and a second plurality of reels in a second display matrix, the plurality of symbols including a first dual symbol of the one or more dual symbols displayed in a first dual symbol display position on the plurality of reels;

cause the first dual symbol displayed in the first dual symbol display position on the plurality of reels to remain in the first dual symbol display position;

activate the wild function of the first dual symbol so that the first dual symbol acts as a wild symbol including evaluating the display matrix by comparing the plurality of symbols included in the display matrix to symbol data stored in one or more lookup tables saved in the memory device;

in response to the evaluation, determine a first feature credit prize to be awarded for the feature game outcome;

determine that the plurality of symbols included in the display matrix also includes a trigger symbol in the same row as the first dual symbol;

in response to the trigger symbol being displayed in the display matrix in the same row as the first dual symbol, activate the prize function of the first dual symbol by awarding a second feature credit prize for the feature game outcome; and award a combination of the first feature credit prize and the second feature credit prize.

8. The electronic gaming device of claim 7, wherein the instructions, when executed by the processor, further cause the processor to:

prior to the feature game outcome being displayed on the display device, determine that a wild or bonus symbol will be displayed in the first dual symbol display position;

in response to the determination that the wild or bonus symbol will be displayed in the first dual symbol display position, dynamically replace the wild or bonus symbol with another symbol of the plurality of symbols; and cause the feature game outcome to be displayed on the display device with the another symbol.

9. The electronic gaming device of claim 7, wherein the instructions, when executed by the processor, further cause the processor to:

in response to the trigger symbol being displayed in the display matrix in the same row as the first dual symbol, cause a mirrored trigger symbol to be displayed in a mirrored row of the second display matrix, wherein the mirrored row is a row positioned similarly in the second display matrix as in the display matrix;

determine that the plurality of symbols included in the second display matrix includes a second dual symbol in the mirrored row;

in response to the mirrored trigger symbol and the second dual symbol being displayed in the second display matrix in the mirrored row, activate the prize function of the second dual symbol by awarding another credit prize for the feature game outcome; and award the other credit prize.

10. The electronic gaming device of claim 7, wherein the instructions, when executed by the processor, further cause the processor to:

determine that the plurality of symbols included in the second display matrix includes a second trigger symbol;

in response to the second trigger symbol being displayed in the second display matrix, cause a mirrored trigger symbol to be displayed in a mirrored row of the display matrix, wherein the mirrored row is a row positioned similarly in the display matrix as in the second display matrix;

determine that the plurality of symbols included in the display matrix includes a second dual symbol in the mirrored row;

in response to the mirrored trigger symbol and the second dual symbol being displayed in the display matrix in the mirrored row, activate the prize function of the second dual symbol by awarding another credit prize for the feature game outcome; and award the other credit prize.

11. The electronic gaming device of claim 7, wherein the instructions, when executed by the processor, further cause the processor to:

determine that the plurality of symbols included in the second display matrix includes a second trigger symbol in a mirrored row of the second display matrix, wherein the mirrored row is a row positioned similarly in the second display matrix as in the display matrix;

in response to the second trigger symbol being displayed in the mirrored row of the second display matrix, replace the trigger symbol in the display matrix and the second trigger symbol in the second display matrix with a multiplier trigger symbol that includes a multiplier;

in response to the multiplier trigger symbol being displayed in the display matrix in the same row as the first dual symbol, activate the prize function of the first dual symbol by awarding a multiplied credit prize for the feature game outcome, wherein the multiplied credit prize is a credit prize increased by the multiplier; and award the multiplied credit prize.

12. The electronic gaming device of claim 11, wherein the instructions, when executed by the processor, further cause the processor to:

determine that the plurality of symbols included in the second display matrix includes a second dual symbol in the mirrored row;

in response to the multiplier trigger symbol being displayed in the second display matrix in the mirrored row, activate the prize function of the second dual symbol by awarding another multiplied credit prize for the feature game outcome; and award the other multiplied credit prize.

13. A computer-implemented method of electronic gaming, the computer-implemented method implemented by a processor, the processor in communication with a display device and a random number generator (RNG), the computer-implemented method comprising:

executing a symbol determination process in association with determining an RNG-based outcome of a base game;

determining a plurality of base game symbols and one or more dual symbols as part of the base game outcome;

determining, in association with a plurality of reels of the base game and as part of the base game outcome, (i) a plurality of base game symbol positions and (ii) a plurality of dual symbol display positions including one or more initial dual symbol display positions and one or more subsequent dual symbol display positions, wherein the one or more subsequent dual symbol display positions are determined in response to initiation of a spin of the plurality of reels and separate from the plurality of base game symbol positions and in association with a persistence characteristic of the one or more subsequent dual symbol display positions, and wherein each of the one or more dual symbols includes both a prize function and a wild function, each of the prize function and the wild function configured to be activated independent of the other;

causing, as part of the base game outcome, the one or more dual symbols to be displayed in the one or more initial dual symbol display positions to remain displayed within a display matrix associated with the plurality of reels in the one or more subsequent dual symbol display positions between reel spins of the plurality of reels based on the persistence characteristic;

prior to the display of the base game outcome on the display device, (i) determine, as part of the symbol determination process, that a first designated symbol will land in a respective dual symbol display position of the one or more subsequent dual symbol display positions, and (ii) dynamically replacing each first designated symbol determined as part of the symbol determination process to land in the one or more subsequent dual symbol display positions with a replacement symbol, thereby causing the replacement symbol to be displayed at each respective dual symbol display position instead of the first designated symbol during each reel spin of the plurality of reels of the base game as part of the base game outcome; and controlling display of the base game outcome on the display device including display of the plurality of base game symbols and the one or more dual symbols such that each replacement symbol is displayed at each respective dual symbol display position of the one or more subsequent dual symbol display positions when the base game outcome is being anticipated but before the base game outcome showing the one or more dual symbols in the one or more subsequent dual symbol display positions is caused to be displayed, wherein the activating of the wild function of each of the one or more dual symbols is performed separate from the activating of the prize function of each of the one or more dual symbols so that each of the one or more dual symbols function as a wild symbol independent from functioning as a prize symbol.

14. The computer-implemented method of claim 13, wherein the base game outcome includes a first base game outcome and a second base game outcome, the computer-implemented method further comprising:

determining the second base game outcome for display on the display device, the second base game outcome being subsequent to the first base game outcome; and causing a first dual symbol of the one or more dual symbols displayed in a first dual symbol display position of the first base game outcome to move upwardly to a second dual symbol display position of the second base game outcome, wherein the second dual symbol display position is located one row above the first dual symbol display position in the display matrix.

15. The computer-implemented method of claim 14, wherein the first base game outcome includes the first dual symbol display position as one of the one or more initial dual symbol display positions, the second base game outcome includes the second dual symbol display position as one of the one or more subsequent dual symbol display positions, the computer-implemented method further comprising:

prior to upwardly moving the first dual symbol, evaluating the second base game outcome including determining that a second dual symbol of the one or more dual symbols included on one of plurality of the reels will be displayed in the second dual symbol display position; and upwardly moving the first dual symbol from the first dual symbol display position to the second dual symbol display position.

16. The computer-implemented method of claim 13, further comprising:

determining that the base game outcome includes a feature symbol;

causing a feature game to be initiated;

determining a feature game outcome for display on the display device, the feature game outcome being subsequent to the base game outcome and comprising the plurality of symbols included on the plurality of reels in the display matrix and a second plurality of reels in a second display matrix;

causing a first dual symbol of the one or more dual symbols displayed in a first dual symbol display position on the plurality of reels to remain in the first dual symbol display position;

activating the wild function of the first dual symbol so that the first dual symbol acts as a wild symbol including evaluating the display matrix by comparing the plurality of symbols included in the display matrix to symbol data stored in one or more lookup tables saved in memory;

in response to the evaluation, determining a first feature credit prize to be awarded for the feature game outcome;

determining that the plurality of symbols included in the display matrix also includes a trigger symbol in the same row as the first dual symbol;

in response to the trigger symbol being displayed in the display matrix in the same row as the first dual symbol, activating the prize function of the first dual symbol by awarding a second feature credit prize for the feature game outcome; and awarding a combination of the first feature credit prize and the second feature credit prize.

17. The computer-implemented method of claim 16, further comprising:

in response to the trigger symbol being displayed in the display matrix in the same row as the first dual symbol, causing a mirrored trigger symbol to be displayed in a mirrored row of the second display matrix, wherein the mirrored row is a row positioned similarly in the second display matrix as in the display matrix;

determining that the plurality of symbols included in the second display matrix includes a second dual symbol in the mirrored row;

in response to the mirrored trigger symbol and the second dual symbol being displayed in the second display matrix in the mirrored row, activating the prize function of the second dual symbol by awarding another credit prize for the feature game outcome; and awarding the other credit prize.

18. A non-transitory computer-readable storage medium with instructions stored thereon that, in response to execution by at least one processor that is in communication with a random number generator (RNG), cause the at least one processor to:

execute a symbol determination process in association with determining an RNG-based outcome for a base game, including determining a plurality of base game symbols and one or more dual symbols as part of the base game outcome;

determine, in association with a plurality of reels of the base game and as part of the base game outcome, (i) a plurality of base game symbol positions and (ii) a plurality of dual symbol display positions including one or more initial dual symbol display positions and one or more subsequent dual symbol display positions, wherein the one or more subsequent dual symbol display positions are determined in response to initiation of a spin of the plurality of reels and separate from the plurality of base game symbol positions and in association with a persistence characteristic of the one or more subsequent dual symbol display positions, and wherein each of the one or more dual symbols includes both a prize function and a wild function, each of the prize function and the wild function configured to be activated independent of the other;

cause, as part of the base game outcome, the one or more dual symbols to be displayed in the one or more initial dual symbol display positions and to remain displayed within a display matrix associated with the plurality of reels in the one or more subsequent dual symbol display positions between reel spins of the plurality of reels based on the persistence characteristic;

prior to the display of the base game outcome on the display device, (i) determine, as part of the symbol determination process, that a first designated symbol will land in a respective dual symbol display position of the one or more subsequent dual symbol display positions, and (ii) dynamically replace each first designated symbol determined as part of the symbol determination process to land in the one or more subsequent dual symbol display positions with a replacement symbol, thereby causing the replacement symbol to be displayed at each respective dual symbol display position instead of the first designated symbol during each reel spin of the plurality of reels of the base game as part of the base game outcome; and control display of the base game outcome on the display device including display of the plurality of base game symbols and the one or more dual display symbols such that each replacement symbol is displayed at each respective dual symbol display position of the one or more subsequent dual symbol display positions when the base game outcome is being anticipated but before the base game outcome showing the one or more dual symbols in the one or more subsequent dual symbol display positions is caused to be displayed, wherein the activation by the at least one processor of the wild function of each of the one or more dual symbols is performed separate from the activation by the at least one processor of the prize function of each of the one or more dual symbols so that each of the one or more dual symbols functions as a wild symbol independent from functioning as a prize symbol.

19. The non-transitory computer-readable storage medium of claim 18, wherein the base game outcome includes a first base game outcome and a second base game outcome, and wherein the instructions, in response to execution by the at least one processor, further cause the at least one processor to:

determine the second base game outcome for display on the display device, the second base game outcome being subsequent to the first base game outcome; and cause a first dual symbol of the one or more dual symbols displayed in a first dual symbol display position of the first base game outcome to move upwardly to a second dual symbol display position of the second base game outcome, wherein the second dual symbol display position is located one row above the first dual symbol display position in the display matrix.

20. The non-transitory computer-readable storage medium of claim 18, wherein a credit prize awarded via the prize function is based on a value shown on each respective dual symbol of the one or more dual symbols.

* * * * *